(12) United States Patent
Khozikov et al.

(10) Patent No.: US 9,020,652 B2
(45) Date of Patent: Apr. 28, 2015

(54) EVENT PROCESSING SYSTEM FOR AN ELECTRICAL POWER SYSTEM

(75) Inventors: Vyacheslav Khozikov, Bellevue, WA (US); Ronald Ward Sackman, Mountain View, CA (US); George Michael Roe, Seattle, WA (US)

(73) Assignee: The Boeing Company, Chicago, IL (US)

( * ) Notice: Subject to any disclaimer, the term of this patent is extended or adjusted under 35 U.S.C. 154(b) by 455 days.

(21) Appl. No.: 13/446,850

(22) Filed: Apr. 13, 2012

(65) Prior Publication Data

US 2013/0274941 A1    Oct. 17, 2013

(51) Int. Cl.
*G05D 3/12*    (2006.01)
*G06F 21/55*    (2013.01)
*H04L 29/06*    (2006.01)

(52) U.S. Cl.
CPC ........ *H04L 63/1441* (2013.01); *H04L 63/1433* (2013.01); *H04L 63/20* (2013.01); *G06F 21/55* (2013.01)

(58) Field of Classification Search
CPC . G06F 21/55; H04L 63/1441; H04L 63/1433; H04L 63/20
USPC ................... 700/286, 292, 295, 297
See application file for complete search history.

(56) References Cited

U.S. PATENT DOCUMENTS

| | | | |
|---|---|---|---|
| 7,734,380 B2 * | 6/2010 | Ransom et al. ............... | 700/286 |
| 8,181,251 B2 * | 5/2012 | Kennedy .......................... | 726/23 |
| 8,561,134 B2 * | 10/2013 | Bezilla et al. ..................... | 726/1 |
| 8,863,278 B2 * | 10/2014 | Chitor et al. .................... | 726/22 |
| 2008/0219186 A1 * | 9/2008 | Bell et al. ...................... | 370/254 |
| 2008/0219239 A1 * | 9/2008 | Bell et al. ...................... | 370/351 |
| 2010/0306533 A1 * | 12/2010 | Phatak .......................... | 713/156 |
| 2011/0204719 A1 | 8/2011 | Sackman et al. | |
| 2011/0208367 A1 | 8/2011 | Sackman et al. | |
| 2011/0288692 A1 | 11/2011 | Scott | |
| 2012/0239218 A1 * | 9/2012 | Forbes, Jr. ..................... | 700/295 |
| 2013/0139214 A1 * | 5/2013 | Chesla .............................. | 726/1 |
| 2013/0191919 A1 * | 7/2013 | Basavapatna et al. .......... | 726/25 |
| 2013/0198847 A1 * | 8/2013 | Sampigethaya ................ | 726/25 |
| 2013/0247205 A1 * | 9/2013 | Schrecker et al. .............. | 726/25 |

FOREIGN PATENT DOCUMENTS

WO    WO2008109684 A1    9/2008

OTHER PUBLICATIONS

EP search report dated Sep. 6, 2013 regarding application 1316785.3-1856, reference 1284P514EPML, applicant The Boeing Company, 2 pages.
Fovino et al., "Modbus/DNP3 State-based Intrusion Detection System," 24th IEEE International Conference on Advanced Information Networking and Applications, Apr. 2010, pp. 729-736.

* cited by examiner

*Primary Examiner* — Robert Fennema
*Assistant Examiner* — Jennifer L Norton
(74) *Attorney, Agent, or Firm* — Yee & Associates, P.C.

(57) ABSTRACT

A method and apparatus comprising an agent. The agent is configured to receive information from an electrical power grid. The agent is further configured to identify an event from the information. The agent is further configured to classify the event. The agent is further configured to determine whether to initiate an action based on a classification of the event. The agent is further configured to initiate the action in response to a determination to initiate the action.

17 Claims, 21 Drawing Sheets

EVENT PROCESSING SYSTEM FOR AN ELECTRICAL POWER SYSTEM

CROSS-REFERENCE TO RELATED APPLICATION

This application is related to patent application U.S. Ser. No. 12/709,400, entitled "Network Centric Power Flow Control", filed Feb. 19, 2010, and patent application U.S. Ser. No. 12/709,407, entitled "Controlling Virtual Power Circuits", filed Feb. 19, 2010, which are incorporated herein by reference.

BACKGROUND INFORMATION

1. Field

The present disclosure relates generally to electrical power and, in particular, to electrical power systems. Still more particularly, the present disclosure relates to a method and apparatus for classifying events in an electrical power system using information collected by agents distributed throughout the electrical power system.

2. Background

An electrical power source supplies electrical power to loads. The electrical power source may generate electrical energy from mechanical, chemical, thermal, and/or other types of energy. The electrical power source transmits this electrical energy as electrical power to the loads. An electrical power source may also store electrical energy that has been generated previously. Electrical power may be delivered from a number of electrical power sources to a number of loads using an electrical power grid. An electrical power grid is comprised of a number of electrical power sources, loads, nodes, and power lines. A node is located at a connection of two or more power lines.

A smart grid is an electrical power grid that gathers, distributes, and performs operations in response to information about the electrical power grid. This information may include, for example, without limitation, information about power use, power generation, power flow, and other types of parameters in the electrical power grid.

A smart grid is enabled using different types of sensing and measurement devices that monitor various parameters in an electrical power grid and process information about these parameters. This information may be distributed to the electrical power grid using, for example, a communications network for the electrical power grid.

The electrical power grid may use this information to manage changes in power distribution, power generation, power use, and other parameters for the electrical power grid. In particular, the electrical power grid may use the information generated by the different sensing and measurement devices to maintain desired power distribution within the electrical power grid.

With this type of smart grid, concerns may be present regarding the physical security and information security of the smart grid. For example, one security concern may be a cyber-attack on the smart grid. In a cyber-attack, an undesired party, such as an unauthorized computer system, may take control of one or more portions of the smart grid. In some case, information may be stolen or manipulated in an undesired manner within the smart grid during a cyber-attack.

Additionally, with currently available configurations for a smart grid, processing the information acquired by the different sensing and measurement devices across the entire electrical power grid may be more difficult and/or more time-consuming than desired. For example, processing the information being distributed across a communications network for the electrical power grid to identify events and determine how to respond to those events may be more difficult and/or more time-consuming than desired. Therefore, it would be desirable to have a method and apparatus that takes into account at least some of the issues discussed above, as well as other possible issues.

SUMMARY

In one illustrative embodiment, an apparatus comprises an agent. The agent is configured to receive information from an electrical power grid. The agent is further configured to identify an event from the information. The agent is further configured to classify the event. The agent is further configured to determine whether to initiate an action based on a classification of the event. The agent is further configured to initiate the action in response to a determination to initiate the action.

In another illustrative embodiment, an apparatus comprises a plurality of nodes in an electrical power grid, a communications network, and a number of agents associated with the plurality of nodes. The plurality of nodes is configured to control electrical power carried on a number of lines in the electrical power grid. The communications network is configured to carry information. The number of agents is configured to send information to each other using the communications network. An agent in the number of agents is configured to receive information from the electrical power grid. The agent in the number of agents is further configured to identify an event from the information. The agent in the number of agents is further configured to classify the event. The agent in the number of agents is further configured to determine whether to initiate an action based on a classification of the event. The agent in the number of agents is further configured to initiate the action in response to a determination to initiate the action.

In yet another illustrative embodiment, a method for processing information in an electrical power grid is present. The information is received from a number of agents in the electrical power grid. An event is identified from the information. The event is classified. A determination is made as to whether to initiate an action based on a classification of the event. The action is initiated in response to a determination to initiate the action.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
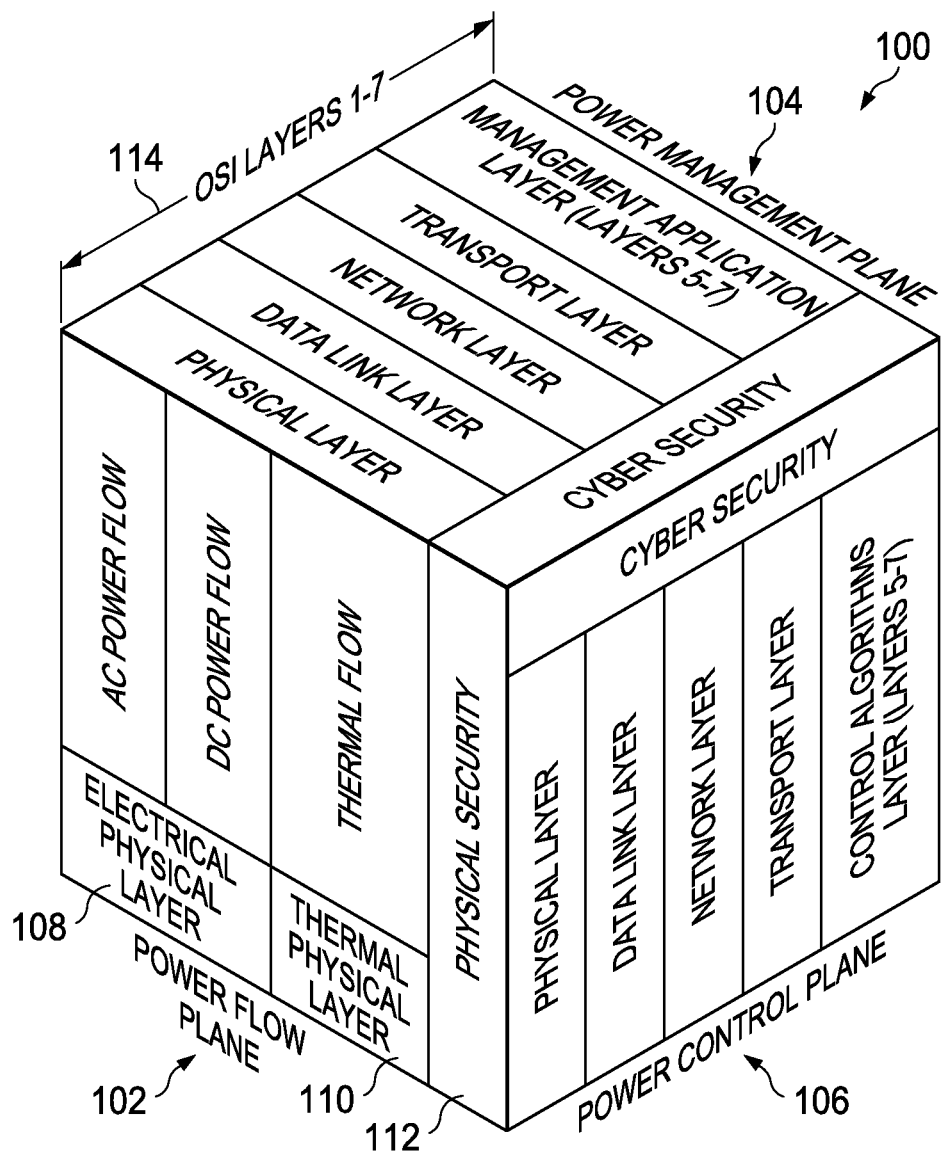
FIG. 1 is an illustration of a power model in accordance with an illustrative embodiment.

With reference now to FIG. 1, an illustration of a power model is depicted in accordance with an illustrative embodiment. In this illustrative example, power model 100 is a three-dimensional power model. Power model 100 may be used to model electrical power in an electrical power grid. More specifically, power model 100 allows power flow, power management, and power control for an electrical power grid to be treated independently of each other.

As depicted, power model 100 includes power flow plane 102, power management plane 104, and power control plane 106. In this illustrative example, power flow plane 102 includes physical aspects of the flow of electrical power through an electrical power grid. These physical aspects include electrical physical layer 108, thermal physical layer 110, and physical security 112.

In this illustrative example, power management plane 104 and power control plane 106 include layers 114, which are part of the Open System Interconnection (OSI) model. The Open System Interconnection model is a model of a communications and computer network architecture divided into seven layers.

Power management plane 104 includes functions performed by a centralized computer system to manage the flow of electrical power in an electrical power grid. For example, a centralized computer system may communicate with the portion of an electrical power grid within a boundary to manage the flow of electrical power within the boundary.

A boundary provides a separation for portions of an electrical power grid. The boundary may be, for example, a geographical boundary, an organizational boundary, an administrative boundary, or some other suitable type of boundary. For example, an organizational boundary may separate two portions of an electrical power grid managed by two different electric providers.

Power control plane 106 includes functions performed by components associated with an electrical power grid across multiple organizational boundaries. These components include, for example, processes running on data processing systems associated with the electrical power grid. These processes may communicate autonomously to control the flow of electrical power through the electrical power grid. As used herein, the term "autonomously" means without human control and/or intervention.

The depiction of power model 100 in FIG. 1 is intended as an illustration and not as an architectural limitation for the different illustrative embodiments. For example, in other illustrative examples, power model 100 may have layers in addition to, or in place of, the different layers shown in power model 100 in FIG. 1.

The illustrative embodiments recognize and take into account one or more different considerations. For example, the illustrative embodiments recognize and take into account that currently used techniques for securing computer networks may not work as well with a computer network within an electrical power environment.

For example, the illustrative embodiments recognize and take into account that some currently available security solutions may be implemented within a centralized system. However, with other types of architectures, such as, for example, a distributed system, these currently available security solutions may be less efficient than desired. In particular, these currently available solutions may be unable to provide a desired level of security with a desired level of speed and/or efficiency.

The illustrative embodiments recognize and take into account that currently used solutions for computer networks may be applied to networks in electrical power environments. These solutions include, for example, checking integrity of messages, bit counting, data chunking, and other known solutions. The illustrative embodiments recognize and take into account that these solutions are applied to power control plane 106 in power model 100 for an electrical power environment.

The illustrative embodiments recognize and take into account that fewer solutions exist for power management plane 104 and these solutions are not as robust as desired. Currently used techniques include firewalls and monitoring of the systems.

The illustrative embodiments recognize and take into account that security issues may affect power management plane 104, power control plane 106, or both power management plane 104 and power control plane 106. These security issues include, for example, cyber-attacks that may attack one or both of these planes.

The illustrative embodiments recognize and take into account that models may be created to protect both of these planes. These models may connect power management plane 104 and power control plane 106 through power flow plane 102. These models, however, are typically limited to known types of security issues. For example, the models may only identify known types of cyber-attacks. These models may only take into account events related to known cyber-attacks such as taking over part of an electrical power grid, shutting down a component, or other events that may occur in known cyber-attacks.

The illustrative embodiments recognize and take into account that this type of model, however, in many instances, may not provide a level of security that is as high as desired. These types of models are unable to take into account new types of cyber-attacks with events that are not currently known.

The illustrative embodiments also recognize and take into account that many of the currently used techniques for identifying security issues are centralized. In other words, the processing of information is typically in one location. As a result, obtaining information may result in congestion in moving information within the electrical power grid. Further, the illustrative embodiments recognize and take into account that similar events may be treated the same although the origin of those events may be different. Thus, the illustrative embodiments provide a method and apparatus for providing security for an electrical power grid that may be performed on a distributed level through agents distributed within the electrical power grid.

As a result, the illustrative embodiments recognize and take into account that it would be desirable to process information generated in the electrical power grid to identify events as well as classify the events. In classifying the events, identification of events that may indicate the presence of a potential physical attack or cyber-attack may be performed to increase security to a desired level.

Figure 2:
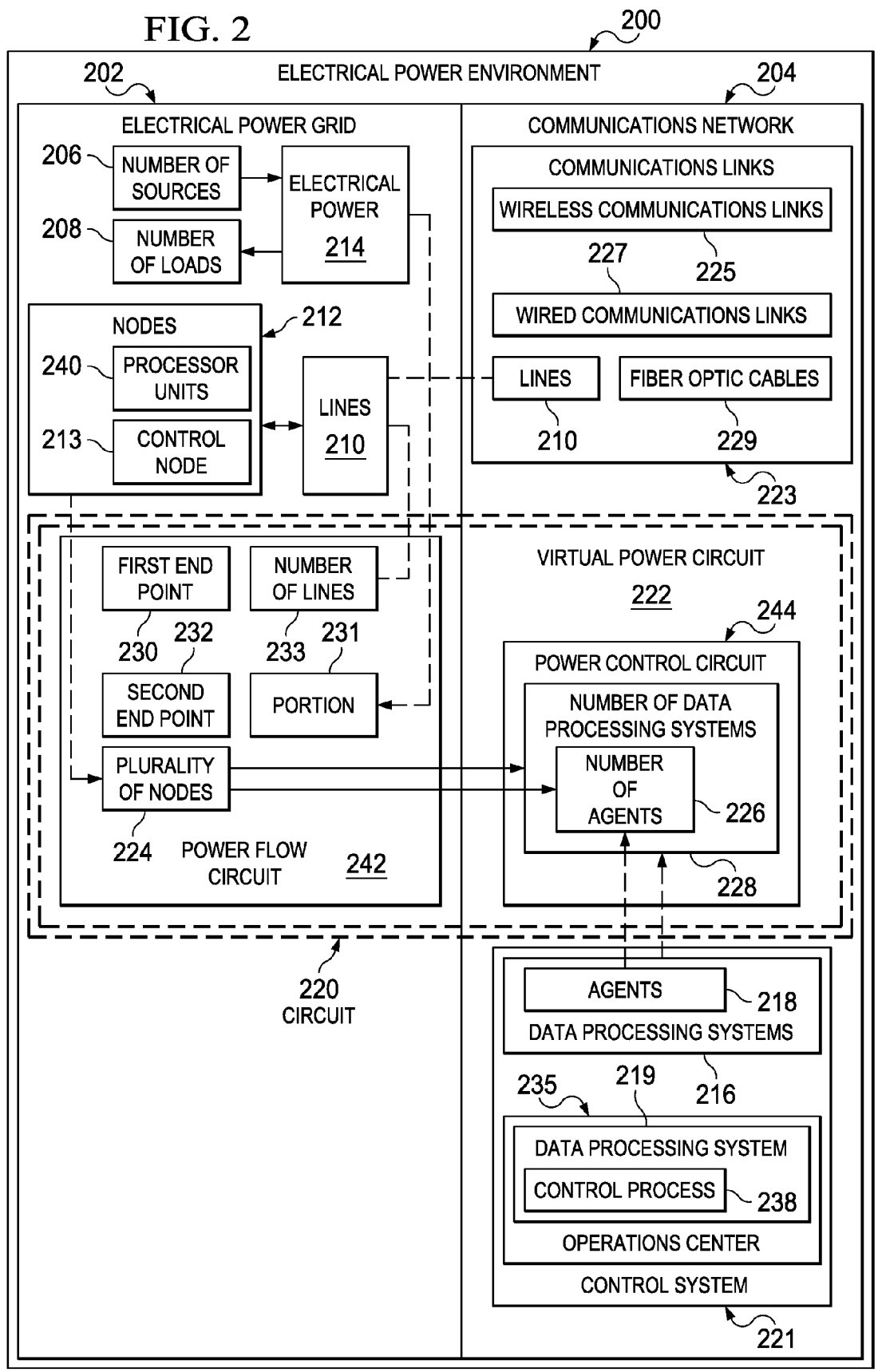
FIG. 2 is an illustration of an electrical power environment in the form of a block diagram in accordance with an illustrative embodiment.

With reference now to FIG. 2, an illustration of a block diagram of an electrical power environment is depicted in accordance with an illustrative embodiment. In this illustrative example, electrical power environment 200 includes electrical power grid 202 and communications network 204. Electrical power grid 202 is configured for use with power flow plane 102 in FIG. 1. Communications network 204 is configured for use with power management plane 104 and/or power control plane 106 in FIG. 1.

As depicted in this example, electrical power grid 202 includes number of sources 206, number of loads 208, lines 210, and nodes 212. Electrical power grid 202 is configured to deliver electrical power 214 from number of sources 206 to number of loads 208. Lines 210 may be used to deliver electrical power 214 from number of sources 206 to number of loads 208. In this illustrative example, lines 210 take the form of transmission lines. More specifically, lines 210 take the form of electrical power lines.

Two or more lines in lines 210 are connected at a node in nodes 212. Nodes 212 transfer electrical power 214 carried in one line in lines 210 to one or more other lines in lines 210. Nodes 212 include at least one of a line sensor, a cooperative flexible alternating current transmission system device, an electronic filter, a phase shifter, a transformer, an adapter, a processor unit, and/or other suitable devices.

As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C, or item B and item C. In other examples, "at least one of" may be, for example, without limitation, two of item A, one of item B, and 10 of item C; four of item B and seven of item C; and other suitable combinations.

In these depicted examples, lines 210 and nodes 212 are interconnected in electrical power grid 202. In other words, the flow of electrical power 214 through at least one of lines 210 and/or at least one of nodes 212 may affect the flow of electrical power 214 through other lines 210 and/or nodes 212. Further, the devices within a node in nodes 212 may affect the flow of electrical power 214 through other nodes 212.

In these illustrative examples, communications network 204 is associated with electrical power grid 202. A first component may be considered to be associated with a second component by being secured to the second component, bonded to the second component, fastened to the second component, and/or connected to the second component in some other suitable manner. For example, a first component may be connected to a second component through wires, wirelessly, or in some other manner. The first component also may be connected to the second component by a third component. The first component also may be considered to be associated with the second component by being part of and/or an extension of the second component.

Communications network 204 includes data processing systems 216 and communications links 223. Data processing systems 216 are associated with nodes 212. As one example, data processing systems 216 may be connected by wires to nodes 212. In these illustrative examples, each data processing system in data processing systems 216 is associated with a node in nodes 212. In other illustrative examples, only a portion of nodes 212 may be associated with data processing systems 216.

As depicted, agents 218 may be implemented in data processing systems 216. Agents 218 may be implemented using hardware, software, of a combination of the two. In one illustrative example, agents 218 may be software processed in the form of program code configured to run on data processing systems 216.

Agents 218 are associated with at least a portion of nodes 212. This portion may be some or all of nodes 212. In these illustrative examples, each of agents 218 runs on a different one of data processing systems 216 in these illustrative examples. In this manner, each agent in agents 218 is associated with a node in nodes 212.

In these depicted examples, when a node in nodes 212 is associated with an agent in agents 218, the node is referred to as control node 213. In some illustrative examples, a node in nodes 212 may be associated with more than one agent in agents 218. For example, a data processing system in data processing systems 216 associated with a node in nodes 212 may run more than one of agents 218.

Communications network 204 allows the exchange of information between agents 218 running on data processing systems 216. Further, communications network 204 allows the exchange of information between a number of processes running on data processing system 219 and agents 218. In these examples, data processing system 219 may be part of operations center 235. Operations center 235 may be located outside of electrical power grid 202. An operator at operations center 235 may monitor and/or control the flow of electrical power 214 through electrical power grid 202 using communications network 204.

This exchange of information in communications network 204 occurs using communications links 223 in communications network 204. For example, agents 218 communicate with each other using communications links 223 in communications network 204.

Communications links 223 may include at least one of lines 210, wireless communications links 225, wired communications links 227, fiber optic cables 229, and other suitable communications links. Further, communications network 204 may include other types of devices, such as, for example, without limitation, switches, routers, and other suitable types of communications devices. In these depicted examples, communications network 204 may be implemented using an Internet Protocol (IP) network.

Agents 218 running on data processing systems 216 are part of control system 221 in electrical power environment 200. In other illustrative examples, control system 221 may include other processes running on other data processing systems. These other data processing systems may be located within and/or outside of electrical power grid 202. For example, control system 221 may include data processing system 219 in operations center 235.

In these illustrative examples, control system 221 is configured to control the flow of electrical power 214 through electrical power grid 202 using agents 218. More specifically, each agent in agents 218 controls the flow of electrical power through the node in nodes 212 associated with the agent.

In these illustrative examples, agents 218 in control system 221 communicate with each other using communications network 204 to form circuit 220. Circuit 220 is virtual power circuit 222 in these examples. Virtual power circuit 222 includes power flow circuit 242 and power control circuit 244. Power flow circuit 242 is formed within electrical power grid 202. Further, power flow circuit 242 operates within power flow plane 102 in FIG. 1. Power control circuit 244 is formed within communications network 204. Power control circuit 244 operates within power control plane 106 in FIG. 1.

Power flow circuit 242 is formed in electrical power grid 202 by first end point 230, second end point 232, plurality of nodes 224 in nodes 212, and number of lines 233 in lines 210. First end point 230 may be selected from one of a source in number of sources 206 and a node in plurality of nodes 224. Second end point 232 may be selected from one of a load in number of loads 208 and a node in plurality of nodes 224.

First end point 230, second end point 232, and plurality of nodes 224 are connected by number of lines 233 in lines 210. Virtual power circuit 222 carries portion 231 of electrical power 214 in electrical power grid 202 in number of lines 233 in these examples. Portion 231 may be some or all of electrical power 214, depending on the configuration of virtual power circuit 222.

Power flow circuit 242 in virtual power circuit 222 may share components with a number of other power flow circuits in electrical power grid 202. As one illustrative example, power flow circuit 242 may share at least a portion of number of lines 233 with another power flow circuit.

For example, a portion of the electrical power flowing in number of lines 233 may or may not have a same starting point as another portion of the electrical power flowing in number of lines 233. Further, a portion of the electrical power flowing in number of lines 233 may or may not be delivered to a same ending point as another portion of the electrical power flowing in number of lines 233. These different portions of electrical power flowing in number of lines 233 may be indistinguishable from each other. Further, these different portions of electrical power flowing in number of lines 233 may be indistinguishable in power flow plane 102 in FIG. 1.

In these depicted examples, plurality of nodes 224 is selected by agents 218 as a group. For example, one, some, or all of agents 218 select plurality of nodes 224. In other words, plurality of nodes 224 for virtual power circuit 222 is selected by at least a portion of agents 218 in control system 221. At least a portion of agents 218 communicates with each other to identify number of agents 226 in agents 218 associated with plurality of nodes 224.

Number of agents 226 runs on number of data processing systems 228 associated with plurality of nodes 224. Number of agents 226 running on number of data processing systems 228 forms power control circuit 244 in virtual power circuit 222.

In these examples, the locations of number of data processing systems 228 in power control circuit 244 may follow the locations of plurality of nodes 224 in power flow circuit 242 in electrical power grid 202. In other words, power control circuit 244 may mirror power flow circuit 242 in these examples.

Number of agents 226 configures plurality of nodes 224 to be part of power flow circuit 242 in virtual power circuit 222. This configuring of plurality of nodes 224 may be based on a number of policies for number of agents 226. In some examples, an agent in number of agents 226 may use more than one policy.

Further, the configuring of plurality of nodes 224 includes using communications network 204 to select number of lines 233 and reserve a capacity in number of lines 233 for the delivery of portion 231 of electrical power 214 through plurality of nodes 224. Number of agents 226 in power control circuit 244 monitors and controls the delivery and flow of portion 231 of electrical power 214 through number of lines 233 and plurality of nodes 224 in power flow circuit 242.

A line in a power flow circuit may carry different flows of electrical power 214 for different power flow circuits formed within electrical power grid 202. Different power control circuits within communications network 204 allow these different flows of electrical power 214 carried in the line to be distinguished from each other in power control plane 106 in FIG. 1. In other words, each power control circuit monitors and controls the flow of electrical power 214 for a particular power flow circuit.

The illustration of electrical power environment 200 in FIG. 2 is not meant to imply physical or architectural limitations to the manner in which different illustrative embodiments may be implemented. Other components in addition to and/or in place of the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

For example, control process 238 in control system 221 may run on data processing system 219 located outside of electrical power grid 202. Control process 238 may communicate with agents 218 through wireless communications links 225. Control process 238 may select number of agents 226 in agents 218 for power control circuit 244. Further, control process 238 may send commands to number of agents 226 to configure plurality of nodes 224 to be part of power flow circuit 242.

In yet other illustrative embodiments, agents 218 may be run on processor units 240 in nodes 212. For example, processor units 240 may be part of different devices in nodes 212.

Figure 3:
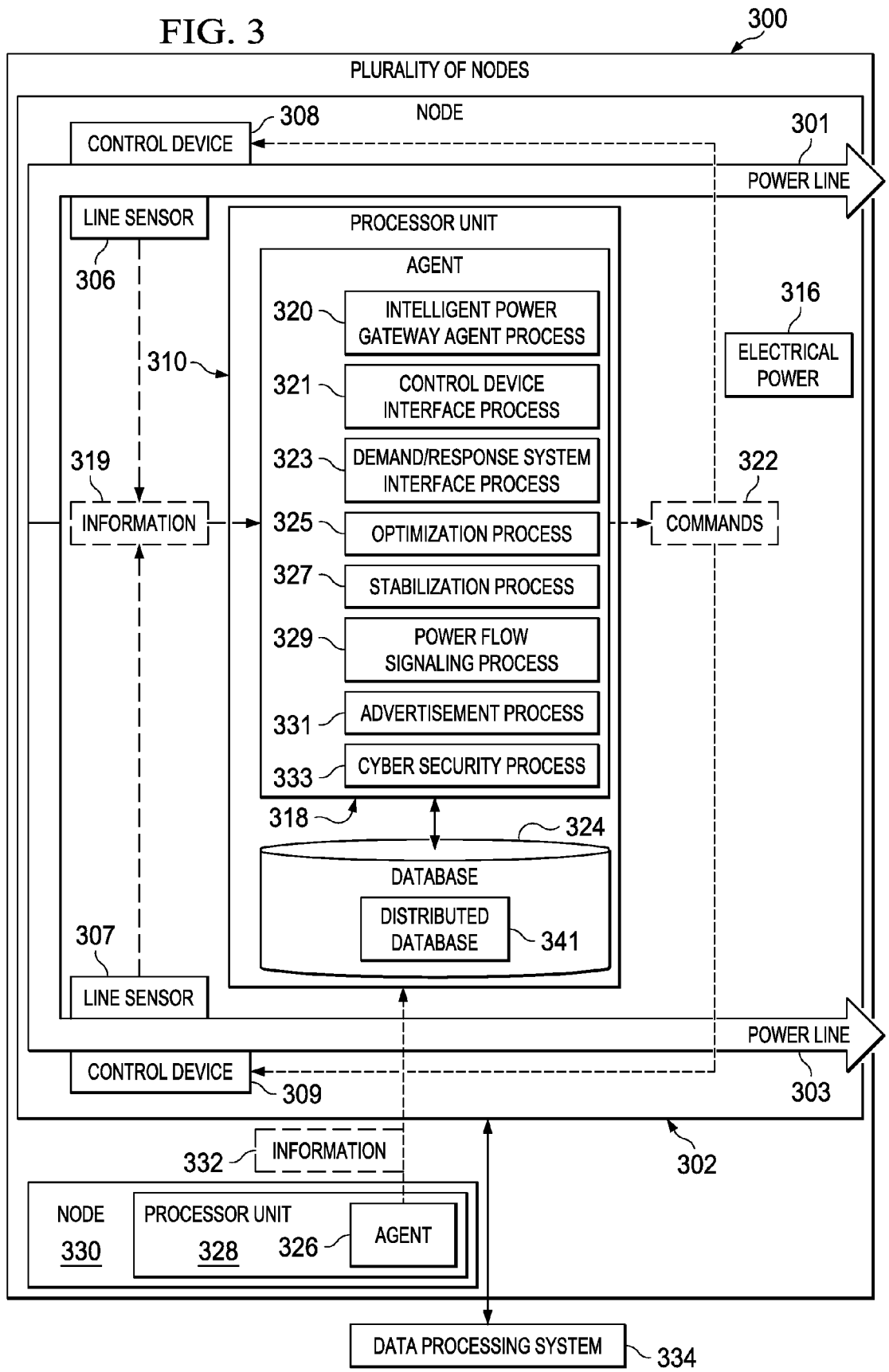
FIG. 3 is an illustration of a plurality of nodes in the form of a block diagram in accordance with an illustrative embodiment.

With reference now to FIG. 3, an illustration of a block diagram of a plurality of nodes is depicted in accordance with an illustrative embodiment. In this illustrative example, plurality of nodes 300 is an example of one implementation for plurality of nodes 224 in FIG. 2. Plurality of nodes 300 is part of a circuit in an electrical power grid, such as circuit 220 in electrical power grid 202 in FIG. 2.

As depicted, plurality of nodes 300 includes node 302. Node 302 is located at the connection of power line 301 and power line 303. Node 302 includes line sensor 306, line sensor 307, control device 308, control device 309, and processor unit 310. Line sensor 306 and control device 308 are located on power line 301. Line sensor 307 and control device 309 are located on power line 303.

In this illustrative example, processor unit 310 may be implemented in a number of different devices, such as a data processing system, a node, a sensor, or some other suitable device. For example, the data processing system may be a data processing system in data processing systems 216 in FIG. 2. Examples of processor unit 310 include a digital signal processor, a controller, a central processing unit, a multi-core processor, or some other similar type of hardware component. Processor unit 310 is configured for communications with line sensor 306, line sensor 307, control device 308, and control device 309.

As depicted, agent 318 runs on processor unit 310. In one illustrative example, agent 318 is implemented in software. Of course, agent 318 also may be implemented in hardware or a combination of the two. In other words, one or more processes performed by agent 318 may be implemented using circuits rather than software run on processor unit 310 in some illustrative embodiments.

As depicted, agent 318 monitors, tracks, and controls the flow of electrical power 316 through node 302. Agent 318 includes a number of processes. These processes include at least one of control device interface process 321, demand and response system interface process 323, optimization process 325, stabilization process 327, power flow signaling process 329, advertisement process 331, cyber security process 333, and other processes. In this illustrative example, cyber security process 333 may process information to identify and classify events in accordance with an illustrative embodiment.

Different agents associated with plurality of nodes 300 may be configured to perform different operations, depending on the processes within the different agents. For example, some agents may be configured to perform only a single operation, while other agents may be configured to perform four or five different types of operations.

When agent 318 includes control device interface process 321, demand and response system interface process 323, optimization process 325, stabilization process 327, power flow signaling process 329, advertisement process 331, and cyber security process 333, agent 318 is referred to as intelligent power gateway agent 320.

Intelligent power gateway agent 320 may have more memory, more computing resources, and faster data transmission rates as compared to other types of agents. Intelligent power gateway agent 320 may be in selected locations in an electrical power grid. These locations are selected to reduce latencies in the exchanging of information, optimize data use, coordinate nodes in plurality of nodes 300 for load-balancing, and reduce the bandwidth used in the exchanging of information.

In this illustrative example, line sensor 306 and line sensor 307 are configured to send information 319 about a number of parameters for power line 301 and power line 303, respectively, to agent 318. Information 319 includes, for example, capacity for the power line, voltage, and/or other suitable information. A capacity for the power line may be a thermal capacity. Further, this capacity may vary with respect to time.

Information 319 may be sent to agent 318 using a communications network, such as communications network 204 in FIG. 2. Information 319 is sent to agent 318 in response to an event. This event may be, for example, without limitation, a request for information 319, the elapsing of a period of time, a beginning of a cycle in a signal, or some other suitable event. A request for information 319 may be made in response to a request for a service received by agent 318. The service may include, for example, without limitation, translation of data, generation of alerts, providing of an interface for exchanging information, and/or other suitable operations.

Agent 318 makes determinations about the flow of electrical power through node 302 using information 319. Agent 318 sends commands 322 to control device 308 and/or control device 309 based on these determinations. Control device 308 and control device 309 are cooperative flexible alternating current transmission system (FACTS) devices in this illustrative example. Control device 308 and control device 309 are configured to change the flow of electrical power 316 through node 302 in response to receiving commands 322.

In this illustrative example, agent 318 stores information 319 in database 324 in processor unit 310. Database 324 is a collection of information. Further, database 324 may be comprised of a number of processes and/or interfaces for accessing the collection of information.

Database 324 may be updated with information 319 when information 319 is received by agent 318. In other illustrative examples, database 324 may be updated based on an event. The event may be, for example, without limitation, the elapsing of a period of time, receiving a request for an update to database 324, or some other suitable event.

Database 324 is distributed database 341 in these examples. Distributed database 341 contains information for other nodes in plurality of nodes 300 in addition to node 302. Distributed database 341 may be associated with all or part of plurality of nodes 300 in this illustrative example. For example, agent 318 may send information 319 stored in distributed database 341 in node 302 to other agents in other nodes in plurality of nodes 300. These other agents may store information 319 in databases associated with these other nodes. These databases are substantially the same as distributed database 341 in these illustrative examples.

Further, in these illustrative examples, distributed database 341 may be distributed across organizational boundaries. In this manner, at least a portion of the agents for plurality of nodes 300 may exchange information across organizational boundaries to create and/or update distributed database 341.

As one illustrative example, agent 326 runs on processor unit 328 associated with node 330 in plurality of nodes 300. Agent 326 receives information 332 and stores information 332 in database 324 in processor unit 328. Agent 326 also sends information 332 to agent 318 using a communications network, such as communications network 204 in FIG. 2. Agent 318 then stores information 332 in database 324 stored in processor unit 310. In this manner, plurality of nodes 300 may autonomously update database 324.

Information is stored in database 324 based on a number of factors. These factors may include, for example, without limitation, the type of information, the quality of information, a length of time for storage, the availability of storage space in database 324, and other suitable factors. The storage of information 319 in database 324 also may be based on a latency and/or throughput of the communications network used by the different agents.

In these illustrative examples, the agents associated with plurality of nodes 300 exchange information using standard TCP/IP network protocols. However, in some illustrative examples, the agents may exchange information using mobile objects. These mobile objects are program code containing information. This information may include information for the node, such as capacity information, routing information, and/or other suitable information. This information may also include, for example, program code for a new process, new rules and/or policies, software upgrades, and/or other suitable types of information.

The mobile objects may be sent to agent 318 from an operations center. Agent 318 reads the mobile object and stores the information within the mobile object. The mobile object clones itself. Agent 318 sends these clones to other agents.

The illustration of plurality of nodes 300 in FIG. 3 is not meant to imply physical or architectural limitations to the manner in which different illustrative embodiments may be implemented. Other components in addition to and/or in place of the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

For example, in some illustrative embodiments, processor unit 310 may be part of data processing system 334. Data processing system 334 may be connected to node 302 instead of being included in node 302. In other illustrative embodiments, processor unit 310 may be part of control device 308 and/or control device 309 in node 302.

In other illustrative embodiments, power lines, in addition to power line 301 and power line 303, may be connected to node 302.

In yet other illustrative examples, sensors in addition to or in place of line sensor 306 and/or line sensor 307 may be associated with power line 301 and/or power line 303. These sensors may be configured to detect parameters, such as, for example, without limitation, temperature, current flow, power phase, line tension, a location for the power lines, and/or other suitable parameters for the power lines.

In some illustrative examples, database 324 may be in a storage device connected to plurality of nodes 300. For example, database 324 may be in a storage device that may be accessed by agent 318 and other agents associated with other nodes in plurality of nodes 300 using wireless communications links.

Figure 4:
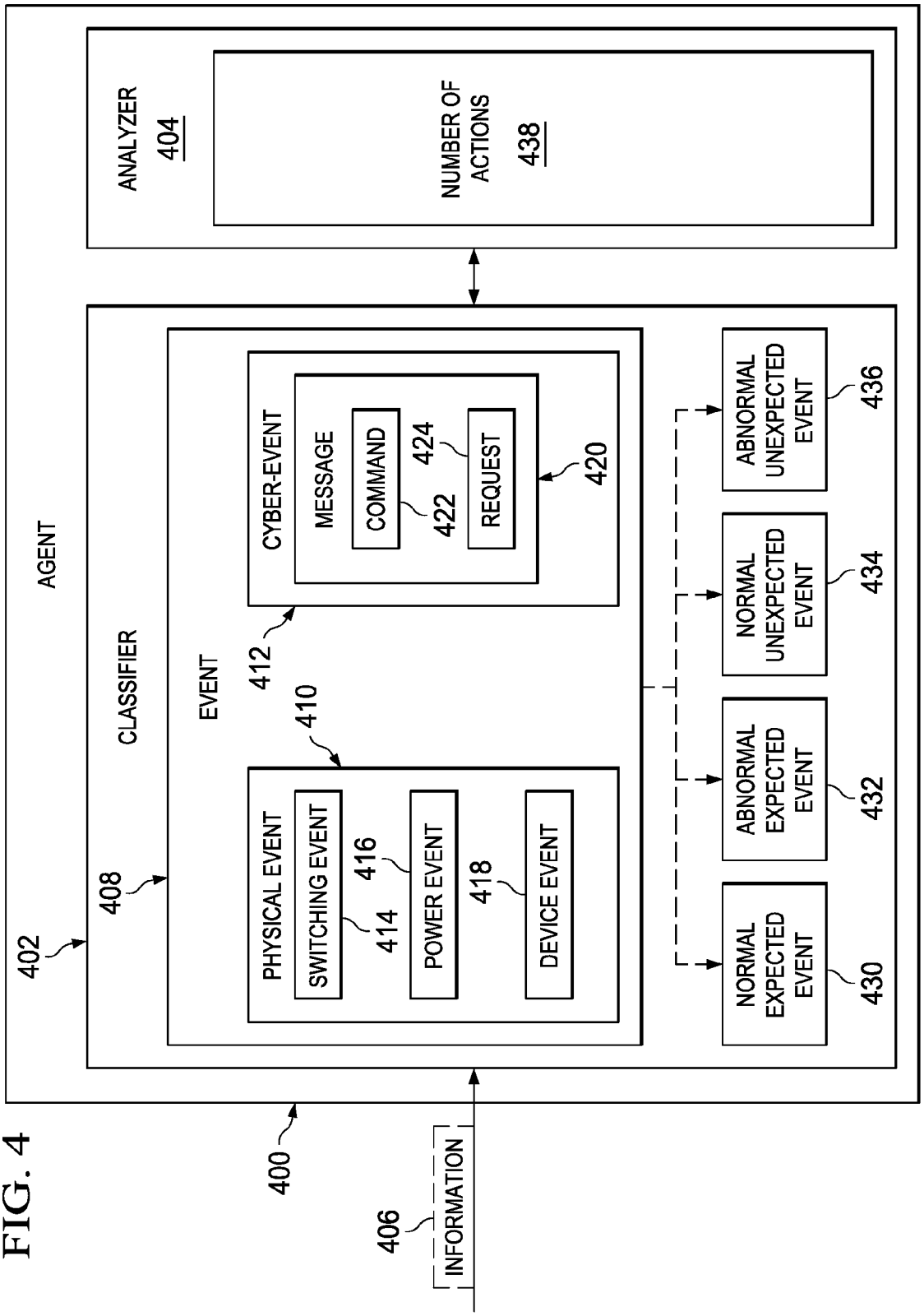
FIG. 4 is an illustration of an agent in the form of a block diagram in accordance with an illustrative embodiment.

With reference now to FIG. 4, an illustration of an agent in the form of a block diagram is depicted in accordance with an illustrative embodiment. In this depicted example, agent 400 is an example of one implementation for an agent in agents 218 in FIG. 2. In some cases, agent 400 may be agent 318 in FIG. 3. Agent 400 may be implemented using hardware, software, or a combination of the two.

As depicted, agent 400 comprises classifier 402 and analyzer 404. Classifier 402 is configured to receive information and process information 406. Information 406 may be received from, for example, without limitation, one or more sensors associated with electrical power grid 202 in FIG. 2, a computer system configured to wirelessly communicate with agent 400 using communications network 204 in FIG. 2, or some other source.

In some illustrative examples, this information may include an identification of event 408. In other illustrative examples, agent 400 may be configured to identify event 408 using information 406.

In these illustrative examples, event 408 may be one of physical event 410 and cyber-event 412. Physical event 410 is an event that occurs within electrical power grid 202 in FIG. 2. For example, physical event 410 may be an event that occurs with respect to one or more devices in electrical power grid 202. In some cases, physical event 410 may be a change in a parameter for a component of electrical power grid 202.

As depicted, physical event 410 may take the form of, for example, without limitation, switching event 414, power event 416, device event 418, or some other type of physical event. Switching event 414 is an event that affects connections between components within electrical power grid 202. For example, switching event 414 may be a connection or disconnection of a load, a power source, or some other suitable type of component within electrical power grid 202.

Power event 416 is an event relating to the power in electrical power grid 202. Power event 416 may be, for example, without limitation, a change in the demand for power, a change in the production of power, a change in the distribution of power, a change in the consumption of power, or some other suitable type of event related to the state of power within electrical power grid 202. Additionally, power event 416 may be a voltage reduction across a power line, a change in the availability of power from a renewable energy source, a change in the availability of power from a storage source, a rerouting of power flow through one or more power lines in electrical power grid 202, or some other suitable type of event.

As depicted, device event 418 is an event relating to the state of devices in electrical power grid 202. Device event 418 may be, for example, without limitation, reconfiguration of a protection device, activation of a protection device, deactivation of a protection device, reconfiguration of a routing device, or some other suitable type of event relating to one or more devices in electrical power grid 202.

In these illustrative examples, a protection device may be, for example, a fuse, a grounding system, a circuit breaker, a power relay, or some other type of device configured to protect a portion of electrical power grid 202. A routing device may be, for example, a relay, a transformer, a reactor, or some other suitable type of device used to route power.

Cyber-event 412 is an information event or a computer-based event. For example, cyber-event 412 may take the form of message 420. Message 420 may be information of any type. In one illustrative example, message 420 may take the form of command 422, request 424, or some other suitable type of information Command 422 may be a directive to agent 400 to perform an action within electrical power grid 202. Command 422 may also be referred to as a request for an action to be performed. Request 424 may be a request for information acquired by agent 400 and/or one or more other agents. In some cases, processing of command 422 and request 424 may result in an action that in turn, results in an event such as, for example, without limitation, event 408. Thus, message 420 also may be a cause of an event.

In these illustrative examples, classifier 402 is configured to classify event 408. In one illustrative example, classifier 402 classifies event 408 as one of normal expected event 430, abnormal expected event 432, normal unexpected event 434, abnormal unexpected event 436, or some other suitable classification for an event.

Event 408 is classified as normal expected event 430 when event 408 is an event that normally occurs and is expected from operation of electrical power grid 202. Normal expected event 430 may include, for example, without limitation, at least one of the connection of a load, the disconnection of a load, the connection of a power source, the disconnection of a power source, a reconfiguration of a power routing device, an activation or deactivation of a switchgear during a scheduled maintenance activity, a fluctuation of power within selected tolerances and/or lasting less than a selected threshold of time, and other suitable types of normal expected events.

Event 408 is classified as abnormal expected event 432 when event 408 does not occur during normal operation of electrical power grid 202, but is expected during operation of electrical power grid 202. Abnormal expected event 432 may include, for example, without limitation, at least one of a voltage flicker, a short circuit, an insulation breakdown, an initiation of a backup operation, harmonics distortion, a cut power line, a voltage reduction, an outage, an emergency event, and other suitable types of abnormal expected events.

Further, event 408 is classified as normal unexpected event 434 when event 408 is not expected to occur during normal operation of electrical power grid 202, but is within selected tolerances for normal operation of electrical power grid 202. In other words, normal unexpected event 434 is an event that is within operational limits for normal operation of electrical power grid 202, but that is not expected.

Normal unexpected event 434 may include, for example, without limitation, at least one of an increase in power consumption, an increase in power generation, a rerouting of power flow, and other suitable types of normal unexpected events. Normal unexpected events may be within selected limits but unexpected based on sensor data from electrical power grid 202.

Event 408 is classified as abnormal unexpected event 436 when event 408 is an event that does not normally occur and is not expected to occur during the operation of electrical power grid 202. Abnormal unexpected event 436 may include, for example, without limitation, at least one of a cyber-security breach, a hostile intrusion in communications network 204 associated with electrical power grid 202, stolen equipment, damaged equipment, and other types of abnormal unexpected events.

Analyzer 404 in agent 400 is configured to determine whether to initiate number of actions 438 based on the classification of event 408. In particular, analyzer 404 may identify the appropriate number of actions 438 that need to be taken based on the classification of event 408 and in some cases, initiate number of actions 438 in response to a determination that number of actions 438 should be initiated.

In some illustrative examples, analyzer 404 may be configured to reclassify event 408 after classifier 402 has already classified event 408. For example, in some cases, analyzer 404 may reclassify message 420 that has been classified as normal unexpected event 434. In other illustrative examples, analyzer 404 may determine that a certain classification for event 408 is inappropriate and may request that classifier 402 reclassify event 408.

As depicted, classifier 402 and analyzer 404, when implemented in software, may be implemented as separate processes, within a same process, or part of one or more other processes running in agent 318 in FIG. 3. For example, classifier 402 and analyzer 404 may be implemented in cyber security process 333 as shown in agent 318 in FIG. 3.

In this manner, when agents 218 are implemented in a manner similar to agent 400, classification of physical events and cyber-events that occur within electrical power environment 200 may occur in a distributed manner across electrical power grid 202 and communications network 204. Further, this type of classification determination of response actions for events using agents 218 distributed across electrical power grid 202 may allow events to be classified and handled more quickly as compared to performing these operations in a centralized system within electrical power grid 202. Additionally, when an agent in agents 218, such as agent 400, is unable to perform the classification of an event or determine response actions for the event, an agent neighboring agent 400 may be able to perform these operations.

The illustration of agent 400 in FIG. 4 is not meant to imply physical or architectural limitations to the manner in which different illustrative embodiments may be implemented. Other components in addition to and/or in place of the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

For example, in some cases, classifier 402 may be configured to classify event 408 as a particular type of event that is different from the different classifications for event 408 depicted in FIG. 4. Further, in some illustrative examples, classifier 402 and analyzer 404 may be part of the same process.

In other illustrative examples, different classifications may be used for event 408. For example, event 408 may be classified only as to whether event 408 is expected or unexpected.

Figure 5:
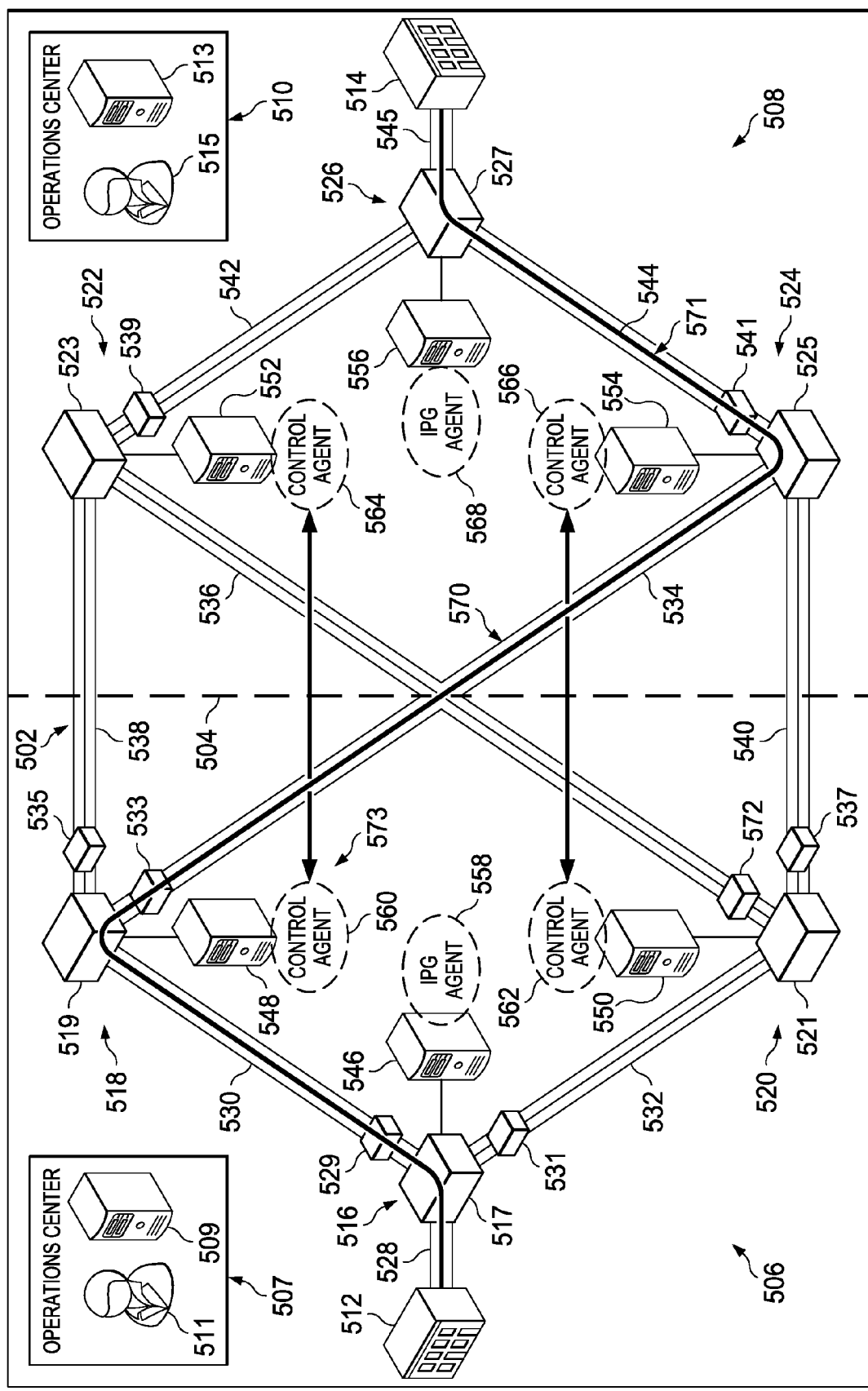
FIG. 5 is an illustration of an electrical power environment in accordance with an illustrative embodiment.

With reference now to FIG. 5, an illustration of an electrical power environment is depicted in accordance with an illustrative embodiment. In this illustrative example, electrical power environment 500 is an example of one implementation for electrical power environment 200 in FIG. 2. Electrical power environment 500 includes electrical power grid 502. Electrical power grid 502 is an example of one implementation for electrical power grid 202 in FIG. 2.

In this illustrative example, electrical power grid 502 has boundary 504. Boundary 504 separates portion 506 of electrical power grid 502 from portion 508 of electrical power grid 502. Further, boundary 504 prevents coordinated power management of portion 506 and portion 508. For example, boundary 504 may be a geographical boundary, an organizational boundary, an administrative boundary, or some other suitable type of boundary.

As one illustrative example, portion 506 of electrical power grid 502 may be managed by operations center 507, while portion 508 of electrical power grid 502 may be managed by operations center 510. Operations center 507 and operations center 510 may not be able to coordinate power management for electrical power grid 502 in this example.

As depicted, operations center 507 may include data processing system 509 operated by operator 511. Operations center 510 may include data processing system 513 operated by operator 515. In this illustrative example, electrical power grid 502 includes generator 512 and load 514. Generator 512 is an example of one implementation for a source in number of sources 206 in FIG. 2. Load 514 is an example of one implementation for a load in number of loads 208. Load 514 may be a home, a factory, a business, an appliance, or some other suitable type of load. Electrical power grid 502 is configured to deliver power supplied by generator 512 to load 514.

Electrical power grid 502 also includes nodes 516, 518, 520, 522, 524, and 526 along with power lines 528, 530, 532, 534, 536, 538, 540, 542, 544, and 545. Nodes 516, 518, 520, 522, 524, and 526 include control devices 517, 519, 521, 523, 525, and 527. These control devices are cooperative flexible alternating current transmission system (FACTS) devices in this illustrative example. However, in other illustrative examples, these control devices may be power semiconductor devices or other suitable types of devices.

Further, node 516 includes line sensor 529 located on power line 530 and line sensor 531 located on power line 532. Node 518 includes line sensor 533 located on power line 534 and line sensor 535 located on power line 538. Node 520 includes line sensor 572 located on power line 536 and line sensor 537 located on power line 540. Node 522 includes line sensor 539 located on power line 542. Node 524 includes line sensor 541 located on power line 544.

In this illustrative example, nodes 516, 518, 520, 522, 524, and 526 are connected to data processing systems 546, 548, 550, 552, 554, and 556, respectively. Agents 558, 560, 562, 564, 566, and 568 run on data processing systems 546, 548, 550, 552, 554, and 556, respectively. These agents control the flow of electrical power through nodes 516, 518, 520, 522, 524, and 526. In particular, the agents use a number of policies to control the flow of electrical power through the nodes.

Agents 558, 560, 562, 564, 566, and 568 may communicate autonomously with each other using communications links, such as communications links 223 in FIG. 2. These communications links are power lines 528, 530, 532, 534, 536, 538, 540, 542, 544, and 545 in this illustrative example. In particular, these communications links take the form of broadband over power lines. Agents 558, 560, 562, 564, 566, and 568 communicate with each other to form virtual power circuit 570.

Virtual power circuit 570 includes power flow circuit 571 and power control circuit 573. Power flow circuit 571 includes generator 512, node 516, node 518, node 524, node 526, load 514, and power lines 528, 530, 532, 538, 542, and 544. Power lines 528, 530, 532, 538, 542, and 544 connect generator 512, node 516, node 518, node 524, node 526, and load 514. Power flow circuit 571 in virtual power circuit 570 is configured to deliver electrical power from generator 512 to load 514.

Power control circuit 573 in virtual power circuit 570 includes agents 558, 560, 564, and 568 associated with nodes 516, 518, 524, and 526, respectively. Power control circuit 573 monitors and controls the flow of electrical power from generator 512 through nodes 516, 518, 524, and 526, and to load 514.

In this illustrative example, agent 558 and agent 568 are configured to perform a greater number of operations than agents 560, 562, 564, and 566. For example, agent 558 and agent 568 may be intelligent power gateway agents, such as intelligent power gateway agent 320 in FIG. 3.

In this depicted example, agent 558 and agent 568 may exchange information with operations center 507 and operations center 510, respectively. This exchange of information allows operator 511 at operations center 507 and operator 515 at operations center 510 to manage portion 506 and portion 508, respectively, of electrical power grid 502 using agent 558 and agent 568, respectively.

Further, virtual power circuit 570 includes components from both portion 506 and portion 508 of electrical power grid 502. Different agents within power control circuit 573 in virtual power circuit 570 are selected to exchange information across boundary 504.

For example, agent 560 and agent 564 are selected to exchange information across boundary 504. Agent 562 and agent 566 are selected to exchange information across boundary 504. In these illustrative examples, these agents exchange information to create and/or update a distributed database, such as distributed database 341 in FIG. 3.

Figure 6:
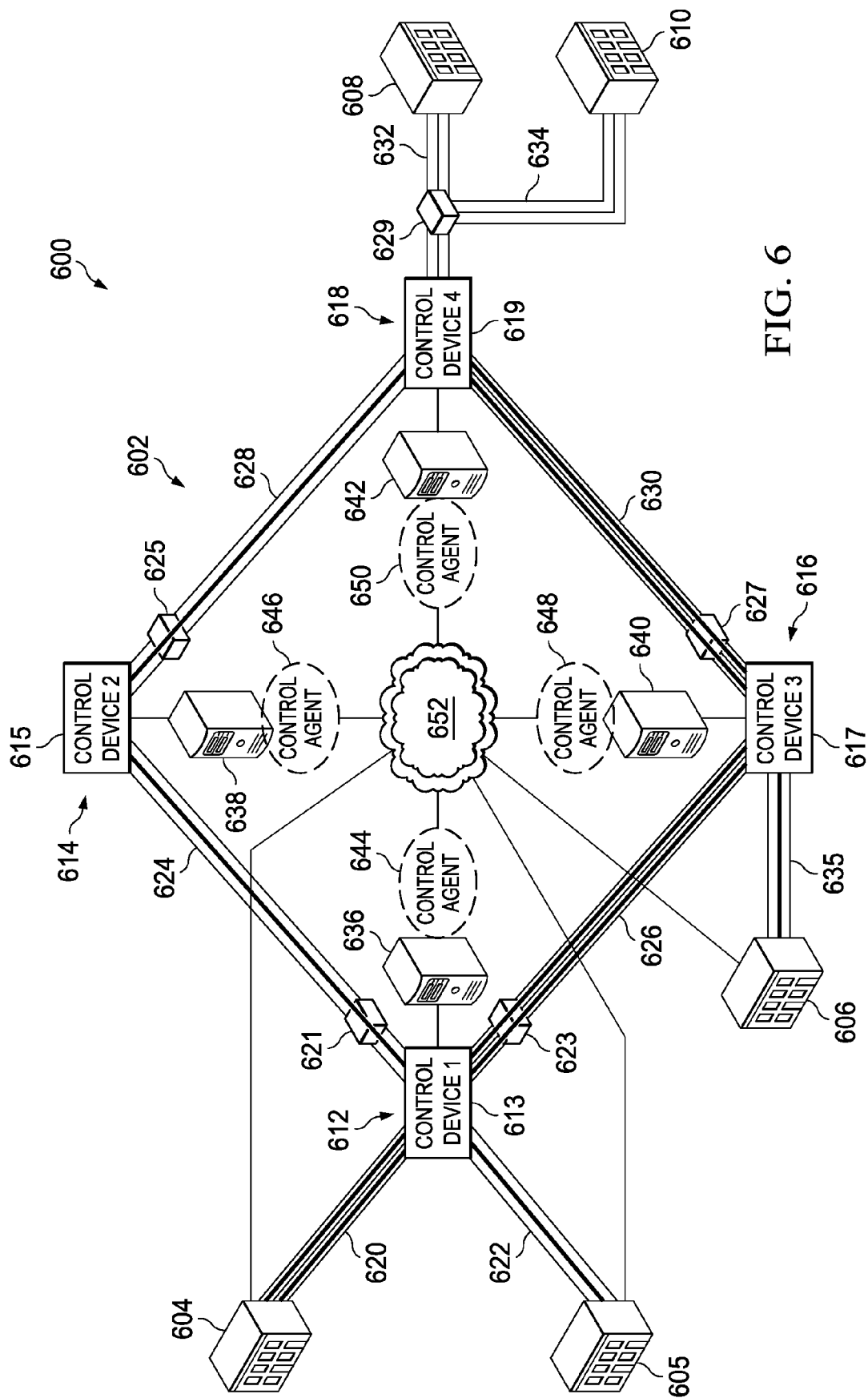
FIG. 6 is an illustration of an electrical power environment in accordance with an illustrative embodiment.

With reference now to FIG. 6, an illustration of an electrical power environment is depicted in accordance with an illustrative embodiment. In this illustrative example, electrical power environment 600 is an example of one implementation of electrical power environment 200 in FIG. 2. Electrical power environment 600 includes electrical power grid 602.

In this illustrative example, electrical power grid 602 includes generator 604, generator 605, generator 606, load 608, load 610, node 612, node 614, node 616, node 618, power line 620, power line 622, power line 624, power line 626, power line 628, power line 630, power line 632, power line 634, and power line 635.

Nodes 612, 614, 616, and 618 include control devices 613, 615, 617, and 619, respectively. These control devices are cooperative flexible alternating current transmission devices in this example. Further, node 612 includes line sensor 621 located on power line 624 and line sensor 623 located on power line 626. Node 614 includes line sensor 625 located on power line 628. Node 616 includes line sensor 627 located on power line 630. Node 618 includes line sensor 629 located on power line 632 and power line 634.

As depicted in this example, nodes 612, 614, 616, and 618 are connected to data processing systems 636, 638, 640, and 642. Agents 644, 646, 648 and 650 run on data processing systems 636, 638, 640, and 642, respectively. Agents 644, 646, 648 and 650 are associated with nodes 612, 614, 616, and 618, respectively. These agents control the flow of electrical power through the nodes.

Further, agents 644, 646, 648 and 650 communicate autonomously with each other using communications network 652. Communications network 652 is an example of one implementation for communications network 204 in FIG. 2. Communications network 652 provides communications through wireless communications links in this illustrative example.

Generators 604, 605, and 606 may also use communications network 652 to communicate with agents 644, 646, 648 and/or 650. Line sensors 621, 623, 625, 627, and 629 use communications network 652 to exchange information with agents 644, 646, 648 and 650.

A number of virtual power circuits may be formed in electrical power grid 602 to provide power supplied by at least one of generators 604, 605, and 606 to at least one of load 608 and load 610. For example, first virtual power circuit 660 may include generator 605, load 608, load 610, node 612, node 614, node 618, power line 622, power line 624, power line 628, power line 632, and power line 634. Agents 644, 646, and 650 configure nodes 612, 614, and 618 to be in first virtual power circuit 660.

Second virtual power circuit 662 may include generator 604, load 608, load 610, node 612, node 616, node 618, power line 620, power line 626, and power line 630. Agents 644, 648, and 650 configure nodes 612, 616, and 618 to be in the virtual power circuit 662.

Third virtual power circuit 664 may include generator 604, load 608, load 610, node 612, node 616, node 618, power line 620, power line 626, and power line 630. Agents 644, 648, and 650 configure nodes 612, 616, and 618 to be in third virtual power circuit 664. As depicted, power line 620, power line 626, and power line 630 carry flows of electrical power for both second virtual power circuit 662 and third virtual power circuit 664.

The flow of electrical power is different in second virtual power circuit 662 and in third virtual power circuit 664. A first portion of the electrical power flowing in power lines 620, 626, and 630 is for second virtual power circuit 662. A second portion of the electrical power flowing in power lines 620, 626, and 630 is for third virtual power circuit 664. However, these portions of electrical power in power lines 620, 626, and 630 for each of these virtual power circuits are indistinguishable in power flow plane 102 in FIG. 1.

Agents 644, 648, and 650 in second virtual power circuit 662 and in third virtual power circuit 664 are able to distinguish between these flows of electrical power through power lines 620, 626, and 630. Further, agents 644, 648, and 650 track, monitor, and control these multiple flows of electrical power. In this manner, virtual power circuits may be used to load balance the flow of electrical power through electrical power grid 602.

The illustrations of electrical power environment 500 in FIG. 5 and electrical power environment 600 in FIG. 6 are not meant to imply physical or architectural limitations to the manner in which different illustrative embodiments may be implemented. For example, in some illustrative embodiments, communications network 652 may provide communications through the power lines in electrical power grid 502. In other words, information may be exchanged using these power lines rather than wireless communications links.

Figure 7:
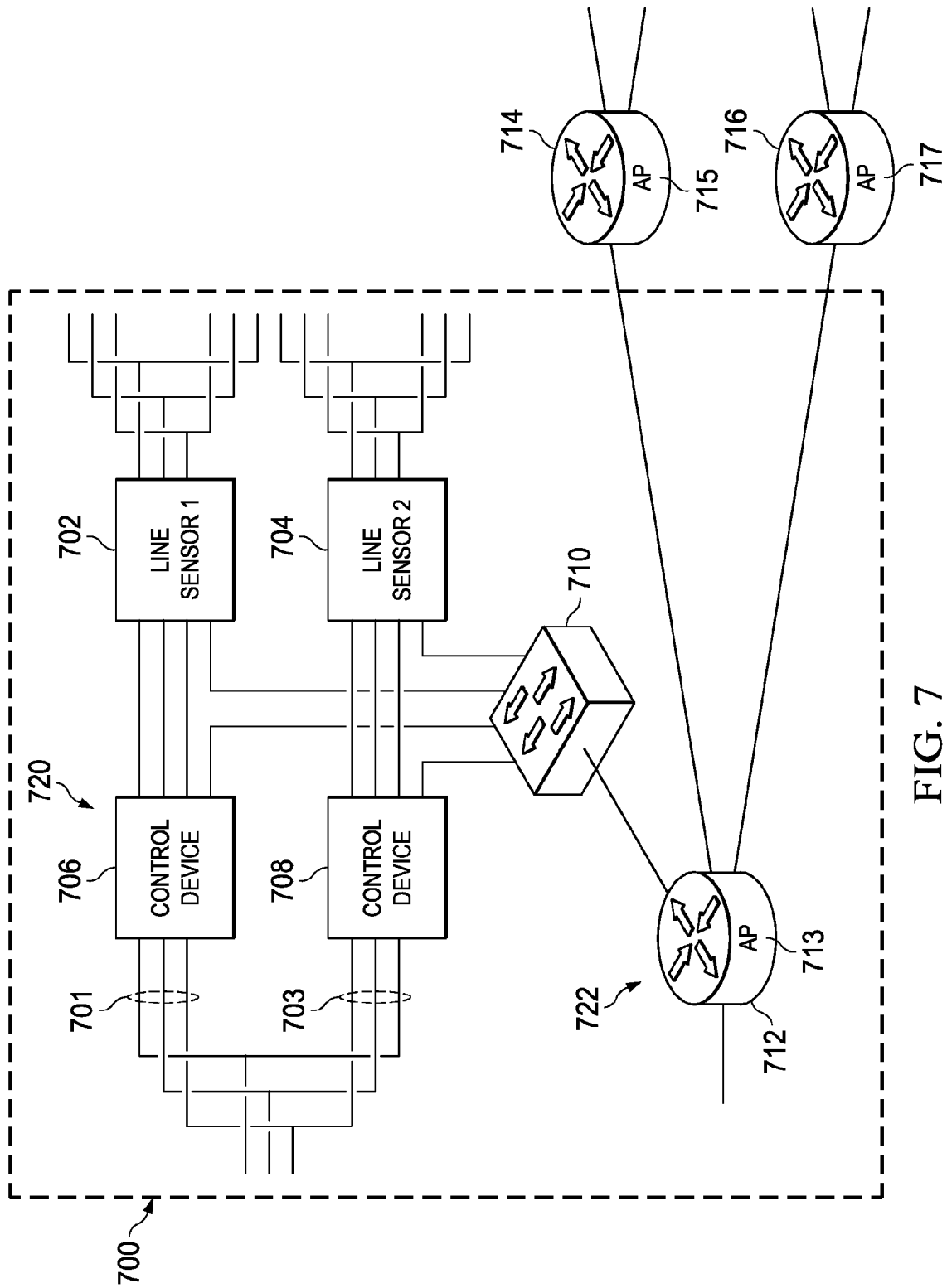
FIG. 7 is an illustration of a control node in accordance with an illustrative embodiment.

With reference now to FIG. 7, an illustration of a control node is depicted in accordance with an illustrative embodiment. In this illustrative example, control node 700 is an example of one implementation of a node in nodes 212 in FIG. 2. Further, control node 700 is an example of one implementation for node 302 in FIG. 3.

As depicted in this example, power line 701 and power line 703 are connected at control node 700. Control node 700 includes line sensor 702, line sensor 704, control device 706, control device 708, switch 710, and processor unit 712 in this illustrative example. Agent 713 runs on processor unit 712.

Line sensor 702 and control device 706 are located on power line 701. Line sensor 704 and control device 708 are located on power line 703. Control device 706 and control device 708 are cooperative flexible alternating current transmission system (FACTS) devices in this illustrative example.

Line sensor 702 and line sensor 704 are configured to sense a number of parameters for power line 701 and power line 703, respectively. These parameters may include, for example, without limitation, electrical power capacity, temperature, current flow, power phase, line tension, a location of the power lines, and other suitable parameters for the power lines. In these examples, line sensor 702 and line sensor 704 are configured to store information for the number of parameters.

In this illustrative example, switch 710 allows line sensor 702, line sensor 704, control device 706, control device 708, and agent 713 running on processor unit 712 to communicate with each other within control node 700. For example, line sensor 702 and line sensor 704 are configured to send the information for the number of parameters for power line 701 and power line 703, respectively, to processor unit 712 through switch 710.

In this illustrative example, agent 713 running on processor unit 712 receives the information for the number of parameters sent from line sensor 702 and line sensor 704 through switch 710. Agent 713 sends commands to control device 706 and/or control device 708 based on the information received.

In these illustrative examples, agent 713 may make determinations about whether the flow of electrical power through power line 701 and/or power line 703 is within a desired threshold. Based on these determinations, agent 713 may send commands to control device 706 and/or control device 708 to control the flow of electrical power through control node 700.

In this illustrative example, agent 713 running on processor unit 712 may exchange information with other agents associated with other control nodes. Exchanging information includes at least one of sending and receiving information. For example, agent 713 may send information to agent 715 running on processor unit 714 and/or agent 717 running on processor unit 716. Processor unit 714 and processor unit 716 are each associated with a different control node.

In this depicted example, the information exchanged between agent 713, agent 715, and/or agent 717 may be stored in a distributed database, such as distributed database 341 in FIG. 3.

In other illustrative examples, processor unit 712 may not be in control node 700. For example, processor unit 712 may be implemented in a data processing system connected to control node 700.

Figure 8:
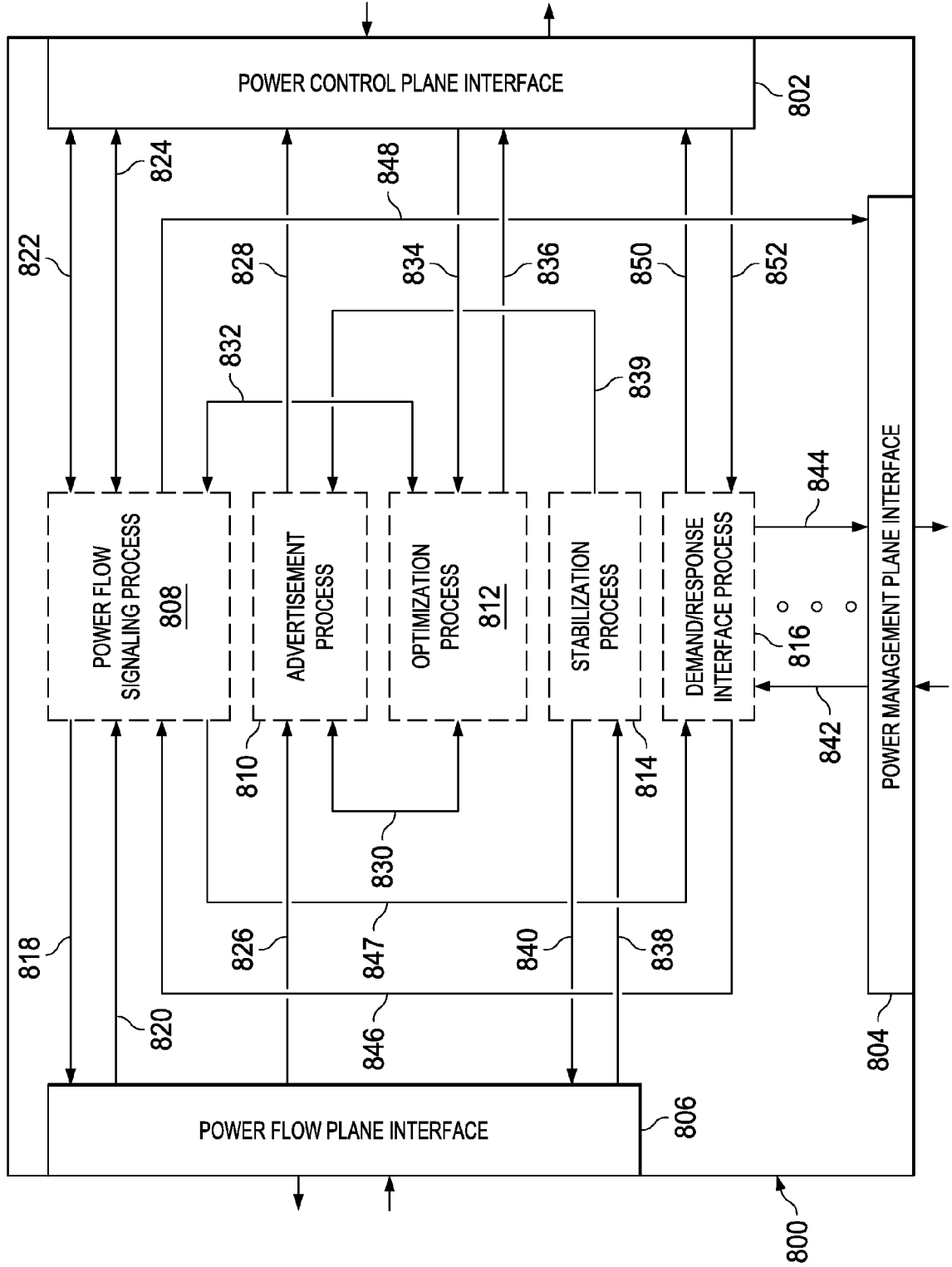
FIG. 8 is an illustration of an agent in accordance with an illustrative embodiment.

With reference now to FIG. 8, an illustration of an agent is depicted in accordance with an illustrative embodiment. In this illustrative example, agent 800 is an example of one implementation for an agent in agents 218 in FIG. 2 and/or agent 318 in FIG. 3. Further, agent 800 may be part of a virtual power circuit, such as virtual power circuit 222 in FIG. 2.

Agent 800 includes power control plane interface 802, power management plane interface 804, and power flow plane interface 806. These interfaces may be, for example, Ethernet interfaces. Power control plane interface 802 allows communications between agent 800 and other agents in an electrical power grid. Power management plane interface 804 allows communications between agent 800 and an operations center. Power flow plane interface 806 allows communications between agent 800 and the devices included in a node associated with agent 800. The devices in the node may include, for example, a number of cooperative flexible alternating current transmission system devices, a number of line sensors, and other suitable devices.

Agent 800 includes power flow signaling process 808, advertisement process 810, optimization process 812, stabilization process 814, and demand and response interface process 816. These processes allow agent 800 to perform operations within power control plane 106 in FIG. 1.

In this illustrative example, power flow signaling process 808 sends request for capacity 818 to a control device in the node associated with agent 800 using power flow plane interface 806. The control device may be, for example, cooperative flexible alternating current transmission system devices. The control device sends message 820 to power flow signaling process 808 to indicate that the request will be granted.

Power flow signaling process 808 also sends and/or receives requests for capacity 822 to and/or from other agents. Further, power flow signaling process 808 sends and/or receives messages 824 to and/or from other agents indicating that requests for capacity 822 will be granted. These agents are associated with nodes that may be, for example, along a path between a power source and a load.

Advertisement process 810 receives information 826 from the line sensor. Advertisement process 810 stores information 826 in a database, such as distributed database 341 in FIG. 3. Further, advertisement process 810 sends advertisement 828 to other agents. Advertisement 828 includes information 826. The other agents may then store information 826 in substantially similar databases. Information 826 may include, for example, without limitation, a capacity of a power line connected to the node associated with agent 800, bus voltage, power flow, phase angle, and/or other suitable information.

In this illustrative example, optimization process 812 receives traffic engineering data 830 from advertisement process 810. Traffic engineering data 830 includes at least a portion of information 826 in this example, as well as other suitable information. For example, traffic engineering data 830 includes the power flow through and capacity of lines connected to the node associated with agent 800, as well as other suitable information.

Optimization process 812 also receives virtual power circuit path information 832 from the other agents associated with other nodes. Virtual power circuit path information 832 includes information, such as, for example, the power flow through and capacity for other nodes and lines not part of the virtual power circuit in which agent 800 is included.

Optimization process 812 uses traffic engineering data 830 and virtual power circuit path information 832 to optimize the flow of electrical power through an electrical power grid. For example, optimization process 812 may provision the node associated with agent 800 to be in a virtual power circuit. This virtual power circuit is used to load balance power flow within the electrical power grid such that the flow of electrical power through the power lines in the electrical power grid is not greater than a capacity for the power lines.

Further, this optimization of the flow of electrical power by optimization process 812 reduces power loss within the electrical power grid, reduces a cost of delivering power within the electrical power grid, and reduces congestion in the electrical power grid. Further, this optimization also protects the control devices from operating outside of safety thresholds and increases power flow relative to the capacity of the electrical power grid. In these examples, a cost is a financial cost.

Optimization process 812 exchanges optimization information 834 with power flow signaling process 808. Power flow signaling process 808 may use optimization information 834 to configure the node associated with agent 800 for optimization of the virtual power circuit. Further, optimization process 812 also sends optimization information 836 to the other agents in the virtual power circuit. The other agents may then use optimization information 836 to configure the other nodes associated with the other agents for optimization.

Optimization information 836 may include, for example, a configuration for a number of virtual power circuits in the electrical power grid that uses the capacity of the power lines in the electrical power grid with a desired efficiency.

Stabilization process 814 receives stability information 838 from the number of devices in the node associated with agent 800. Stability information 838 may include values for a number of parameters for the number of devices. For example, stability information 838 may include voltage data, volt-amperes reactive (VAr) data, and other suitable types of data for the node.

For example, stability information 838 may indicate the presence of undesired fluctuations in the distribution of electrical power through the node. Commands 840 may be sent to a control device in the node to configure the control device to maintain a substantially desired distribution of electrical power through the node.

Further, stabilization process 814 also sends stability information 839 to advertisement process 810. Advertisement process 810 may store stability information 838 in the database. Further, advertisement process 810 may send stability information 839 to the other agents to be stored in the substantially similar databases.

Demand and response interface process 816 communicates with an operations center, such as operations center 507 and/or operations center 510 in FIG. 5. This communication is through power management plane interface 804. An operator at the operations center may send request 842 for information to demand and response interface process 816. This information may be from the number of devices in the node and/or from other devices in other nodes. Demand and response interface process 816 sends message 844 to indicate that request 842 will be granted.

Demand and response interface process 816 sends request for capacity 846 to power flow signaling process 808. In response to receiving request for capacity 846, power flow signaling process 808 sends request for capacity 818 to a control device in the node associated with agent 800 and requests for capacity 822 to other agents. In particular, requests for capacity 822 are sent to a number of agents along a path between a power source and a load in the electrical power grid. This number of agents may be used to configure the nodes associated with the number of agents to be in a virtual power circuit.

In this depicted example, the node associated with agent 800 and the nodes associated with the number of agents send message 820 and messages 824, respectively, to power flow signaling process 808. These messages indicate that request for capacity 818 and requests for messages 824 will be granted. In other words, these messages indicate that the nodes are available and have the capacity to be part of the virtual power circuit.

In response to receiving message 820 and messages 824, power flow signaling process 808 sends message 847 to demand and response interface process 816 indicating that the request for the information will be granted.

In some illustrative examples, agent 800 takes the form of an intelligent power gateway agent, such as intelligent power gateway agent 320 in FIG. 3. In these examples, demand and response interface process 816 is used to exchange information with other intelligent power gateway agents.

For example, demand and response interface process 816 may send request for power 850 to another intelligent power gateway agent through power control plane interface 802. Demand and response interface process 816 receives message 852 from this intelligent power gateway agent through power control plane interface 802 acknowledging request for power 850.

In this illustrative example, power flow signaling process 808 also sends information 848 to the operations center using power management plane interface 804. Information 848 is for the health and status of the virtual power circuit.

Figure 9:
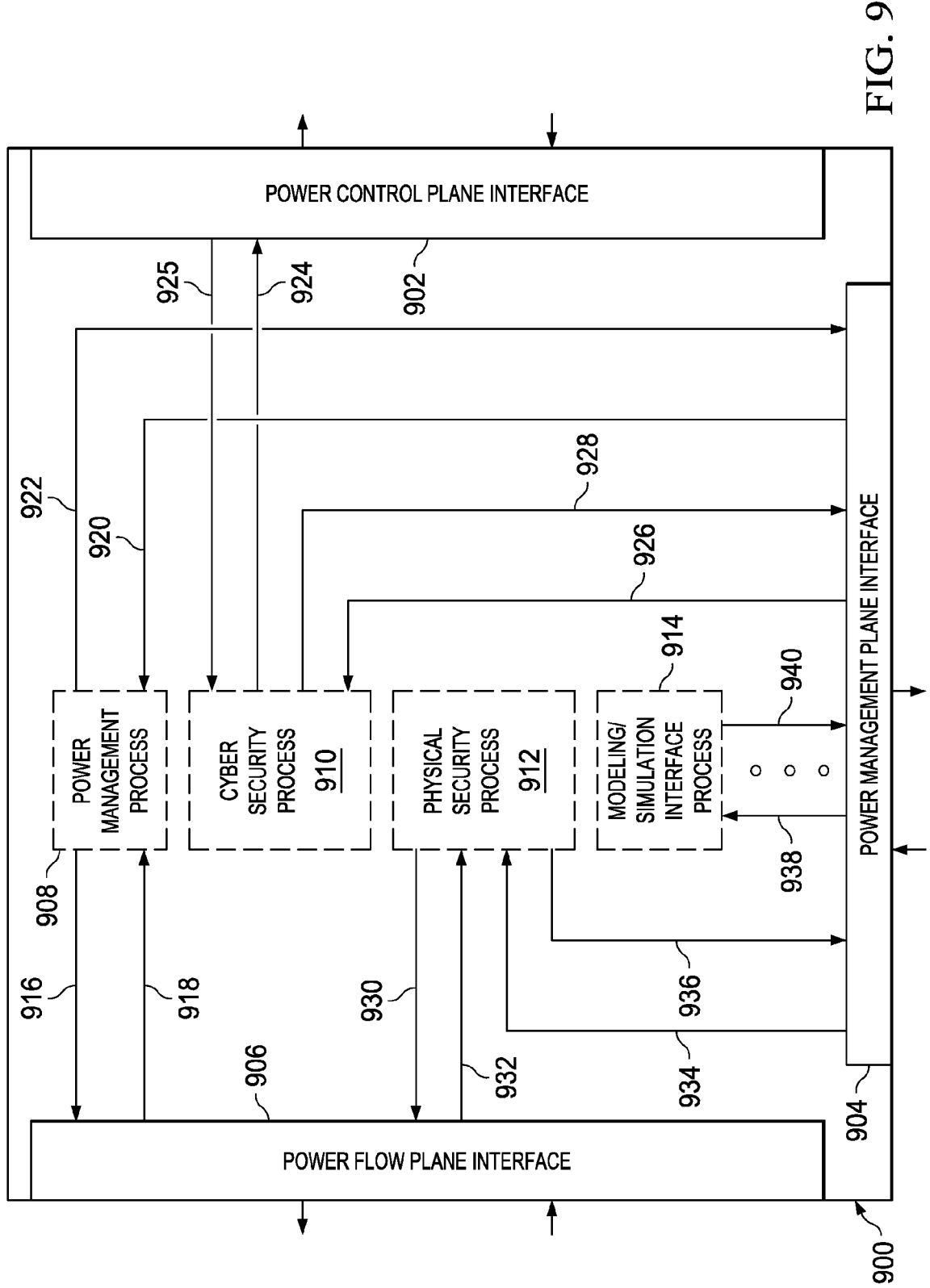
FIG. 9 is an illustration of an agent in accordance with an illustrative embodiment.

With reference now to FIG. 9, an illustration of an agent is depicted in accordance with an illustrative embodiment. In this illustrative example, agent 900 is an example of one implementation for an agent in agents 218 in FIG. 2 and/or agent 318 in FIG. 3. As depicted in this example, agent 900 includes power control plane interface 902, power management plane interface 904, and power flow plane interface 906. These interfaces may be, for example, Ethernet interfaces.

Agent 900 also includes power management process 908, cyber security process 910, physical security process 912, and modeling/simulation interface process 914. These processes allow agent 900 to perform operations in power management plane 104 in FIG. 1. Further, these processes, in this illustrative example, may be only a portion of the processes in agent 900.

Power management process 908 sends commands and status requests 916 to a number of devices in the node associated with agent 900. Commands and status requests 916 are for health and status information for the number of devices in the node associated with agent 900. The number of devices sends responses 918 to power management process 908. Responses 918 include the requested health and status information in these examples. Power management process 908 may also receive commands and status requests 920 from an operations center. In response to commands and status requests 920, power management process 908 sends status information and responses 922 to the operations center.

Cyber security process 910 sends cyber security information 924 to other agents and receives cyber security information 925 from the other agents. Cyber security information 924 may include logs, alerts, security events, passwords, rules, thresholds, policies, and/or other suitable types of information. Further, cyber security process 910 receives commands and status requests 926 from the operations center. Cyber security process 910 sends cyber security information 928 to the operations center. Cyber security information 928 may include logs, alerts, security events, and/or other suitable types of information.

Physical security process 912 sends commands and status requests 930 to a number of devices in the node associated with agent 900. Physical security process 912 receives physical security information 932 from the number of devices in the node. For example, commands and status requests 930 may be sent to a camera in the node. The camera may send back video in physical security information 932.

Further, physical security process 912 receives commands and status requests 934 from the operations center. Physical security process 912 sends physical security information 936 to the operations center. Physical security information 936 includes logs, physical security events, alerts, and/or other suitable information.

In these illustrative examples, cyber security process 910 and/or physical security process 912 may be configured to receive information directly from and/or about the electrical power grid. For example, physical security process 912 or cyber security process 910 may receive a notification of an event that has occurred within the electrical power grid.

In particular, physical security process 912 may receive a notification of a physical event that has occurred or is occurring within the electrical power grid. Further, cyber security process 910 may receive a notification of an information event, such as a message from another agent.

Cyber security process 910 and physical security process 912 are configured to classify events. Further, these processes are configured to determine whether one or more actions need to be initiated based on the classifications of these events. In some illustrative examples, these processes are configured to initiate the actions needed to respond to these events.

Modeling/simulation interface process 914 may perform simulations for the node associated with agent 900. These simulations may be for a distribution of electrical power in the node.

Modeling/simulation interface process 914 receives request 938 from the operations center. Request 938 may be for information generated by running the simulations for the node. Modeling/simulation interface process 914 sends information 940 to the operations center.

In some illustrative examples, the processes in agent 900 and the processes in agent 800 in FIG. 8 may be processes associated with the same node. For example, agent 800 and agent 900 may both run on a processor unit in a node.

The processes in agent 900 and the processes in agent 800 in FIG. 8 may exchange information and/or work together to perform operations. For example, cyber security process 910 in agent 900 may be used with advertisement process 810 in agent 800.

As a more specific example, advertisement 828 may be sent from advertisement process 810 in agent 800 to other agents only after cyber security information 924 is sent by cyber security process 910 in agent 900 to the other agents. In this manner, the other agents may verify the node associated with agent 900 and agent 800.

Figure 10:
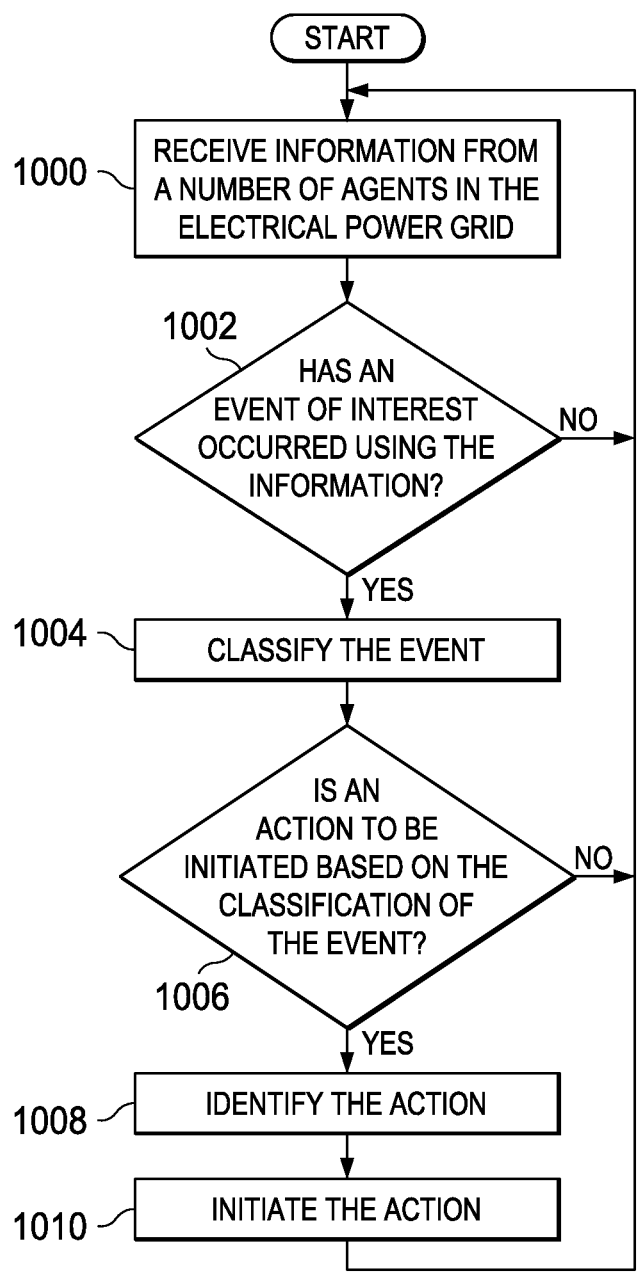
FIG. 10 is an illustration of a process for processing information in an electrical power grid in the form of a flowchart in accordance with an illustrative embodiment.

With reference now to FIG. 10, an illustration of a process for processing information in an electrical power grid in the form of a flowchart is depicted in accordance with an illustrative embodiment. The process illustrated in FIG. 10 may be implemented in electrical power environment 200 in FIG. 2. In particular, this process may be implemented using one or more agents in agents 218 in FIG. 2, agent 318 in FIG. 3, or agent 400 in FIG. 4.

The process begins by receiving information from a number of agents in the electrical power grid (operation 1000). This information may be received in a number of different forms. For example, the information may comprise at least one of sensor data, measurements, a meter reading, a voltage reading, an alert, a message, a request, a command, an image, a video, a notification, control data, and other suitable types of information.

Next, the process determines whether an event of interest has occurred using the information (operation 1002). For example, in operation 1002, the process may determine whether a physical event, such as physical event 410 in FIG. 4, or a cyber-event, such as cyber-event 412 in FIG. 4, has occurred.

If an event of interest has occurred, the process classifies the event (operation 1004). The process then determines whether an action is to be initiated based on the classification of the event (operation 1006). If an action is to be initiated, the action is identified (operation 1008). Thereafter, the action is initiated (operation 1010), with the process returning to operation 1000 as described above.

With reference again to operation 1006, if an action is not to be initiated, the process returns to operation 1000 as described above. With reference again to operation 1002, if an event of interest has not occurred, the process returns to operation 1000 as described above.

Figure 11:
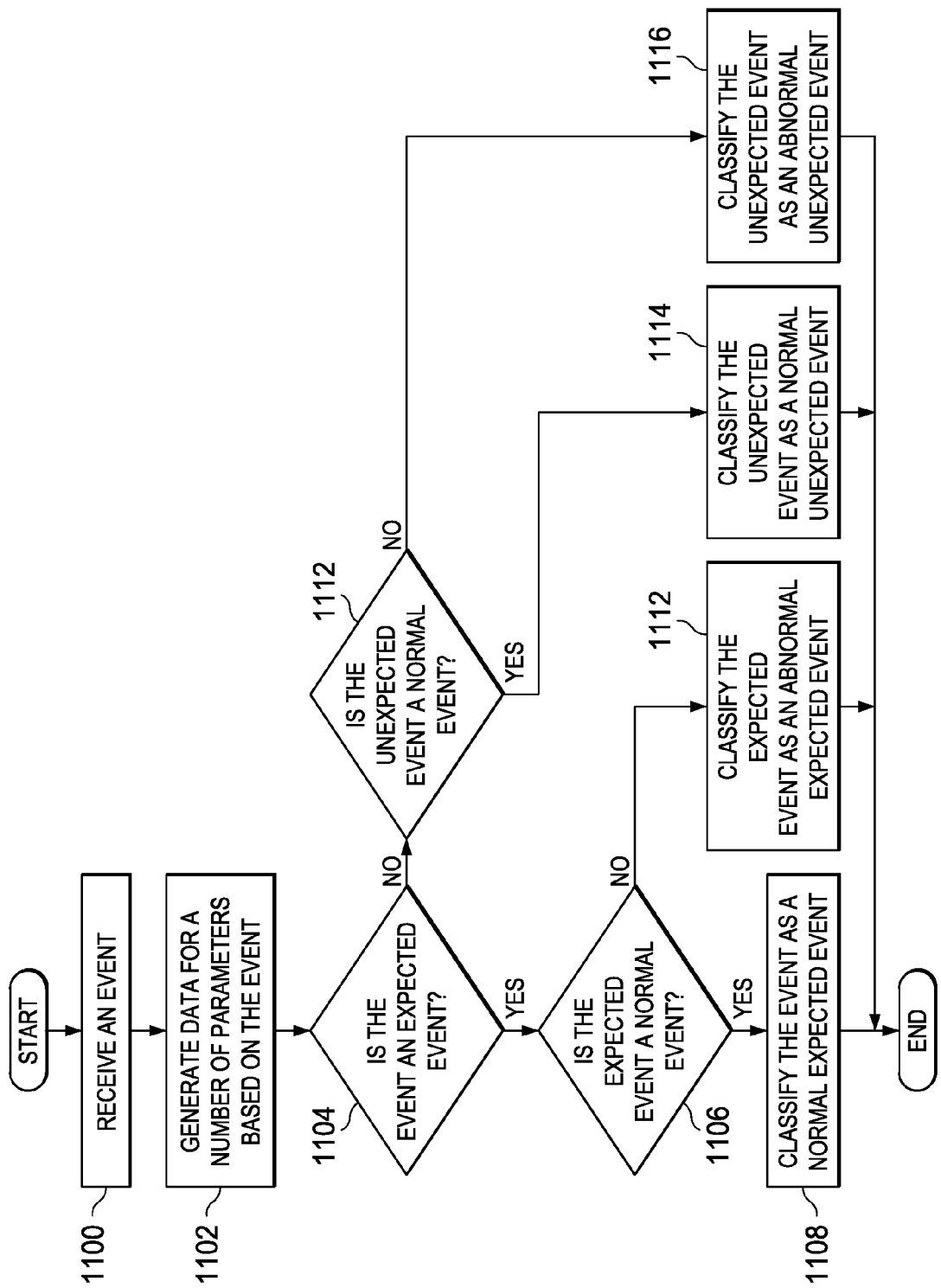
FIG. 11 is an illustration of a process for classifying an event in the form of a flowchart in accordance with an illustrative embodiment.

Turning now to FIG. 11, an illustration of a flowchart of a process for classifying an event is depicted in accordance with an illustrative embodiment. The process illustrated in FIG. 11 may be used to implement operation 1004 in FIG. 10.

The process begins by receiving an event (operation 1100). The event may be, for example, the event that was determined as having occurred in operation 1002 in FIG. 10. The process then generates data for a number of parameters based on the event (operation 1102). When the event is a physical event, the parameters may include, for example, without limitation, an amount of power, a voltage level, a level of current, frequency, and/or other suitable types of parameters.

The process then determines whether the event is an expected event using at least one of the data for the number of parameters and a set of expected events (operation 1104). The set of expected events may be one or more events that have been previously identified as expected events.

If the event is an expected event, the process determines whether the expected event is a normal event using at least one of the data for the number of parameters and a set of normal events (operation 1106). The set of normal events may be one or more events that have been previously identified as normal events.

As used herein, a "normal event", may be an event in which the values for parameters corresponding to the electrical power grid are nominal, within selected limits, or outside of selected limits but within selected time intervals. These parameters may include, for example, without limitation, power level, current, voltage, frequency, power factor, and/or other suitable types of parameters. A value for a parameter that is outside of selected limits but within a selected time interval is a value that that is outside of selected limits for a period of time below a selected threshold.

An event that is not a normal event is considered an abnormal event. As used herein, an "abnormal event" may be an event in which the values for parameters corresponding to the electrical power grid are not nominal or are outside of selected limits and outside of selected time intervals. Further, an abnormal event may be an emergency type of event. For example, an emergency type of event may be a fault current, a short circuit, a voltage flicker, a voltage drop, an insulation breakdown, a back-up operation, harmonics distortion, or some other suitable type of emergency type of event.

If the expected event is a normal event, then the event is classified as a normal expected event (operation 1108), with the process terminating thereafter. Otherwise, the expected event is classified as an abnormal expected event (operation 1110), with the process also terminating thereafter.

With reference again to operation 1104, if the event is not an expected event, the process determines whether the unexpected event is a normal event using at least one of the data for the number of parameters and the set of normal events (operation 1112). If the unexpected event is a normal event, then the unexpected event is classified as a normal unexpected event (operation 1114), with the process terminating thereafter. Otherwise, the process classifies the unexpected event as an abnormal unexpected event (operation 1116), with the process terminating thereafter.

Figure 12A:
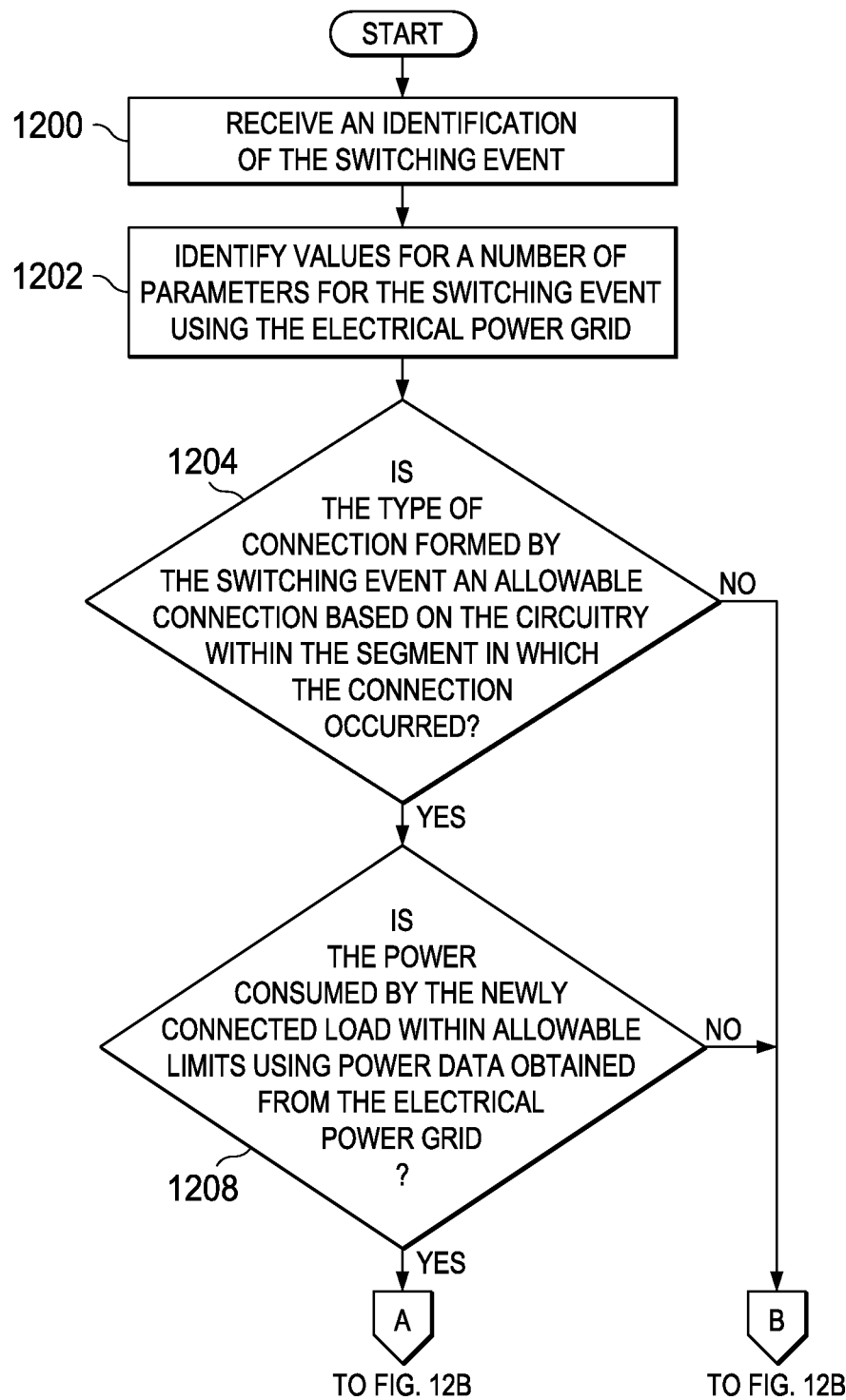
FIGS. 12A and 12B are illustrations of a process for classifying a switching event in the form of a flowchart in accordance with an illustrative embodiment.
Figure 12B:
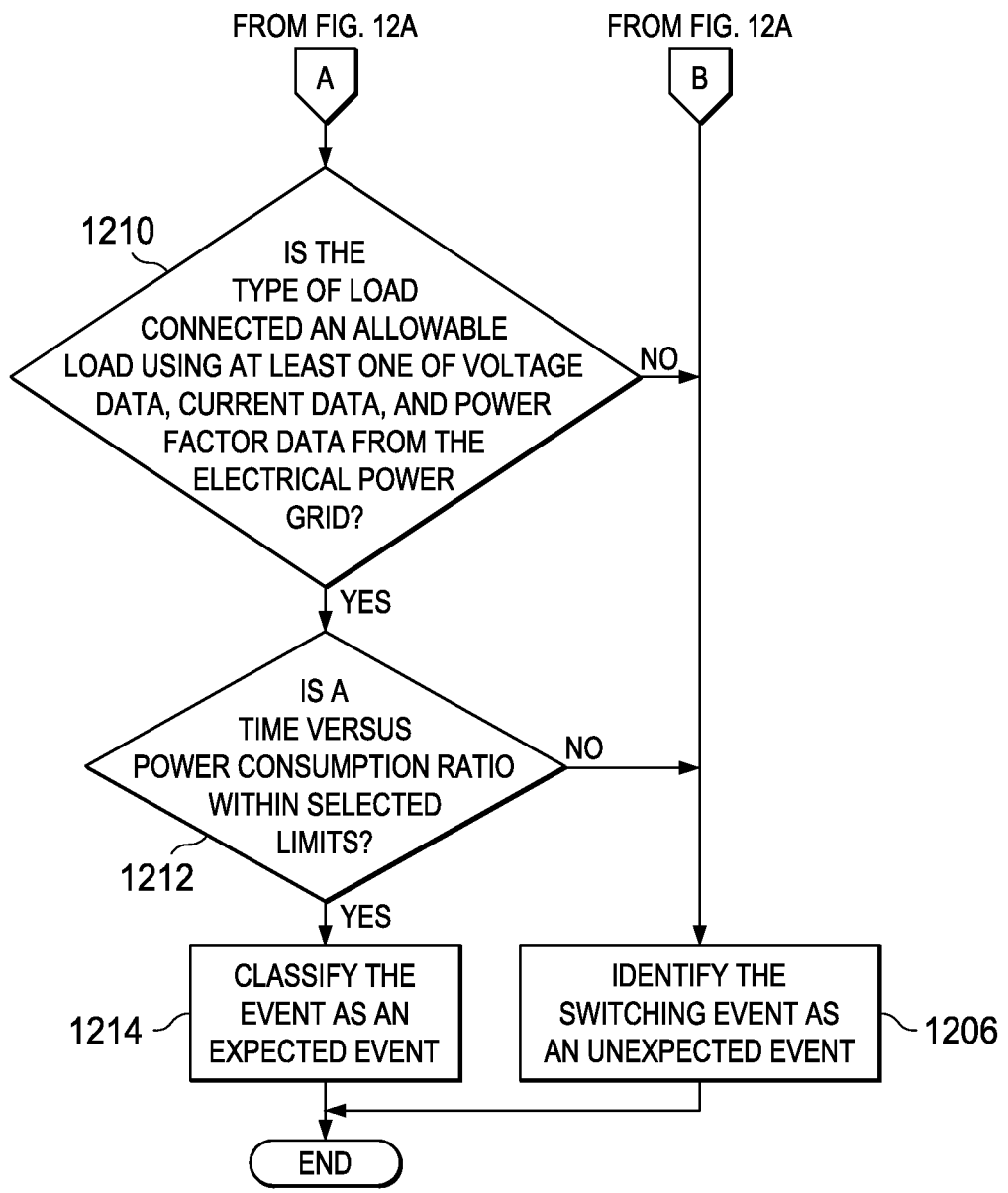

With reference now to FIGS. 12A and 12B, illustrations of a process for classifying a switching event in the form of a flowchart are depicted in accordance with an illustrative embodiment. The process illustrated in FIGS. 12A and 12B may be implemented in electrical power environment 200 in FIG. 2. In particular, this process may be implemented in one or more agents in agents 218 in FIG. 2, agent 318 in FIG. 3, or agent 400 in FIG. 4.

This process may be one illustrative example of how a physical event, such as switching event 414 in FIG. 4, may be classified as either an expected event or an unexpected event within electrical power environment 200. Further, the process illustrated in FIGS. 12A and 12B may be used to implement operation 1104 in FIG. 11.

The process begins by the agent receiving an identification of the switching event (operation 1200). In this illustrative example, the switching event is a connection of a load to the electrical power grid. Of course, in other illustrative examples, the switching event may be a disconnection of a load from the electrical power grid or some other type of switching event.

The agent then identifies values for a number of parameters for the switching event using the electrical power grid (operation 1202). For example, the agent may communicate with the segment of the electrical power grid in which the switching event occurred. This segment is a portion of the circuitry within the electrical power grid.

The agent determines whether the type of connection formed by the switching event is an allowable connection based on the circuitry within the segment in which the connection occurred (operation 1204). If the type of connection is not an allowable connection, the process identifies the switching event as an unexpected event (1206), with the process terminating thereafter.

Otherwise, the agent determines whether the power consumed by the newly connected load is within allowable limits using power data obtained from the electrical power grid (operation 1208). The power data may include, for example, power readings from power meters, smart meters, and/or other suitable devices within and/or near the segment of the electrical power grid in which the connection occurred.

If the power consumed by the newly connected load is not within the allowable limits, the process proceeds to operation 1206 as described above. Otherwise, the agent determines whether the type of load connected is an allowable load using at least one of voltage data, current data, and power factor data from the electrical power grid (operation 1210).

If the type of load is not an allowable load, the process proceeds to operation 1206 as described above. Otherwise, the agent determines whether a time versus power consumption ratio is within selected limits (operation 1212). This determination may be performed using, for example, without limitation, a selected period of time after the connection was formed and a level of power consumption by the load during the selected period of time.

If the time versus power consumption ratio is not within selected limits, the process proceeds to operation 1206 as described above. Otherwise, the agent classifies the event as an expected event (operation 1214), with the process terminating thereafter.

Figure 13:
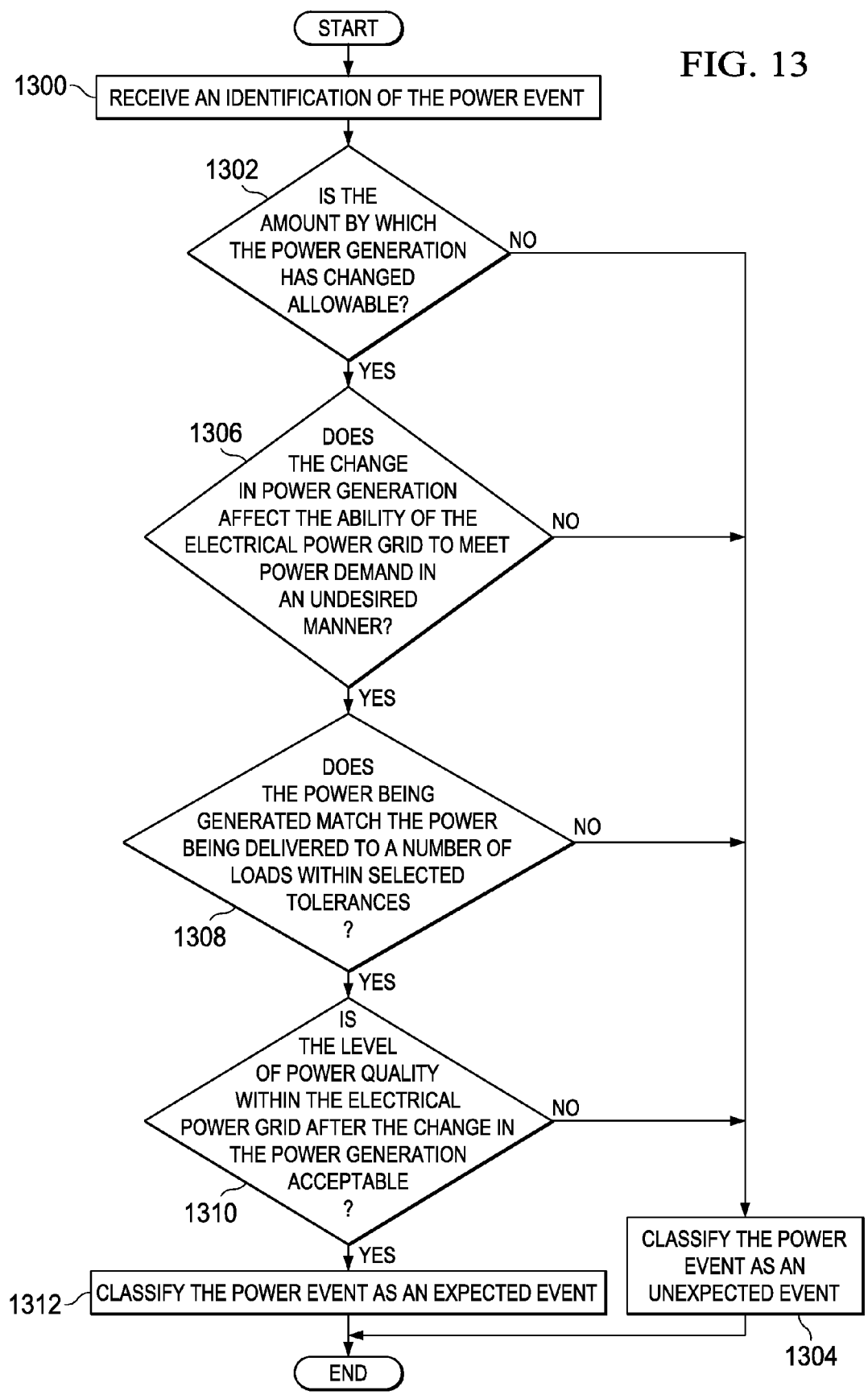
FIG. 13 is an illustration of a process for classifying a power event in the form of a flowchart in accordance with an illustrative embodiment.

With reference now to FIG. 13, an illustration of a process for classifying a power event in the form of a flowchart is depicted in accordance with an illustrative embodiment. The process illustrated in FIG. 13 may be implemented in electrical power environment 200 in FIG. 2. In particular, this process may be implemented in one or more agents in agents 218 in FIG. 2, agent 318 in FIG. 3, or agent 400 in FIG. 4.

The process in FIG. 13 may be one illustrative example of how a physical event, such as power event 416 in FIG. 4, may be classified as either an expected event or an unexpected event within electrical power environment 200. The process illustrated in FIG. 13 may be used to implement operation 1104 in FIG. 11.

The process begins by the agent receiving an identification of the power event (operation 1300). In this illustrative example, the power event is a change in power generation within the electrical power grid. Of course, in other illustrative examples, the power event may be a change in power demand within the electrical power grid or some other type of power event.

The agent then determines whether the amount by which the power generation has changed is allowable (operation 1302). This determination is made using, for example, without limitation, a determination as to whether the change occurs during a peak season or an off-peak season, weather information, power data, and/or other suitable types of data.

If the amount by which the power generation has changed is not allowable, the agent classifies the power event as an unexpected event (operation 1304), with the process terminating thereafter. Otherwise, the agent determines whether the change in power generation affects the ability of the electrical power grid to meet power demand in an undesired manner (operation 1306).

If the change in power generation affects the ability of the electrical power grid to meet power demand in an undesired manner, the process proceeds to operation 1304 as described above. Otherwise, the agent determines whether the power being generated matches the power being delivered to a number of loads within selected tolerances (operation 1308).

If the power being generated does not match the power being delivered to a number of loads within selected tolerances, the process proceeds to operation 1304 as described above. Otherwise, the agent determines whether the level of power quality within the electrical power grid after the change in the power generation is acceptable (operation 1310). If the level of power quality is not acceptable, the process proceeds to operation 1304 as described above. Otherwise, the agent classifies the power event as an expected event (operation 1312), with the process terminating thereafter.

Figure 14:
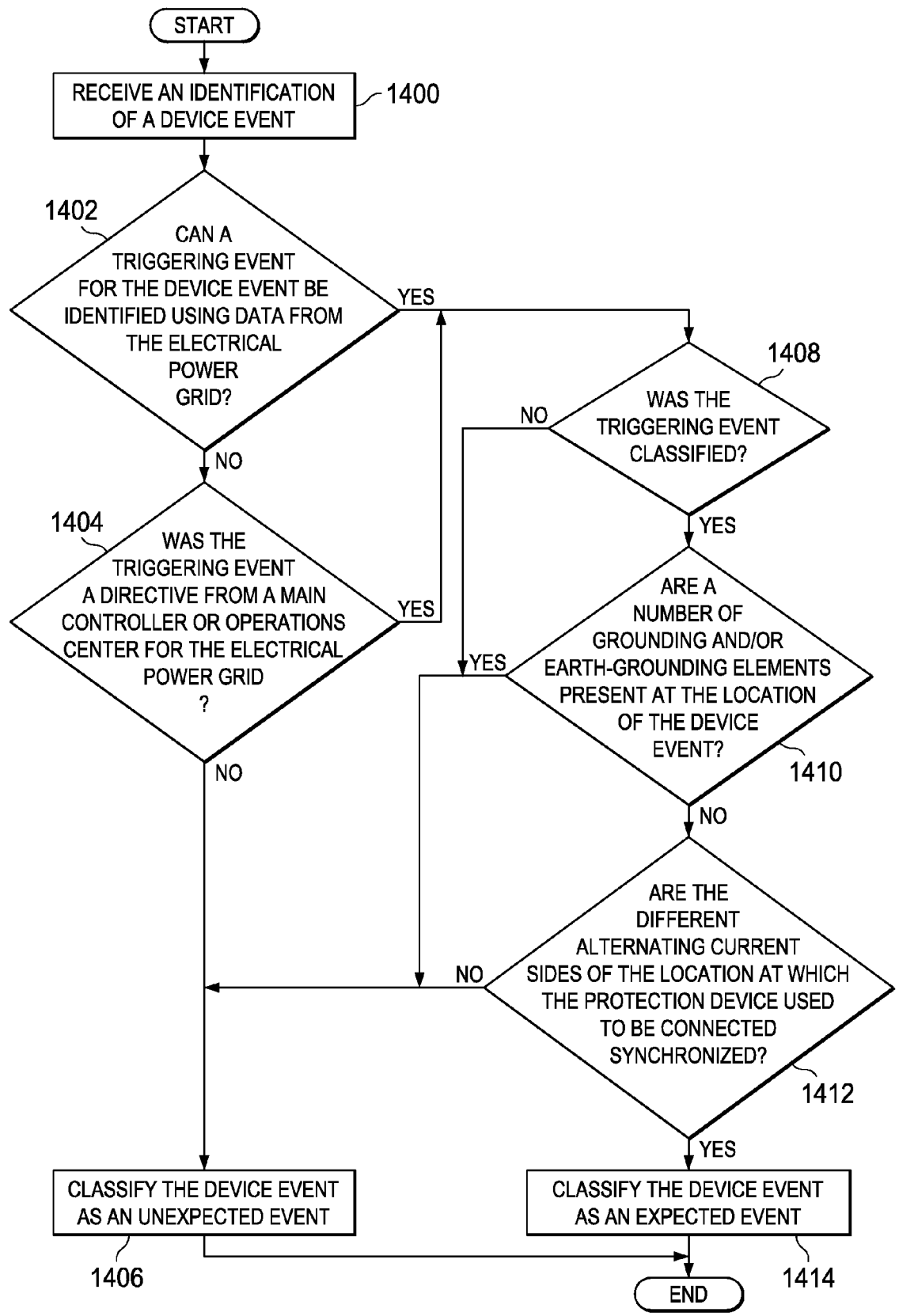
FIG. 14 is an illustration of a process for classifying a device event in the form of a flowchart in accordance with an illustrative embodiment.

With reference now to FIG. 14, an illustration of a process for classifying a device event in the form of a flowchart is depicted in accordance with an illustrative embodiment. The process illustrated in FIG. 14 may be implemented in electrical power environment 200 in FIG. 2. In particular, this process may be implemented in one or more agents in agents 218 in FIG. 2, agent 318 in FIG. 3, or agent 400 in FIG. 4.

The process illustrated in FIG. 14 may be one illustrative example of how a physical event, such as device event 418 in FIG. 4, may be classified as either an expected event or an unexpected event within electrical power environment 200. The process illustrated in FIG. 14 may be used to implement operation 1104 in FIG. 11.

The process begins by the agent receiving an identification of a device event (operation 1400). In this illustrative example, the device event is an activation of a protection device. Of course, in other illustrative examples, the device event may be a deactivation of a protection device or some other type of device event. The agent then determines whether a triggering event for the device event can be identified using data from the electrical power grid (operation 1402).

In operation 1402, the agent may use data from the segment of the electrical power grid in which the device event occurred and known values for parameters for the circuitry in this segment to identify the triggering event. The triggering event may be, for example, another physical event that occurred within the electrical power grid or a cyber-event.

If a triggering event for the device cannot be identified, the agent determines whether the triggering event was a directive from a main controller or operations center for the electrical power grid (operation 1404). For example, the agent may communicate with the main controller or operations center for the electrical power grid to make this determination.

If the triggering event was not a directive from the main controller or operations center for the electrical power grid, the agent classifies the device event as an unexpected event (operation 1406), with the process terminating thereafter. Otherwise, the agent determines whether the triggering event was classified (operation 1408).

If the triggering event was not classified, the process proceeds to operation 1406 as described above. Otherwise, the agent determines whether a number of grounding and/or earth-grounding elements are present at the location of the device event (operation 1410). This determination may be made using, for example, voltage data obtained from the electrical power grid.

If grounding and/or earth-grounding elements are present at the location of the device event, the process proceeds to operation 1406 as described above. Otherwise, the agent determines whether the different alternating current sides of the location at which the protection device used to be connected are synchronized (operation 1412).

If the different alternating current sides are not synchronized, the process proceeds to operation 1406 as described above. Otherwise, the agent classifies the device event as expected (operation 1414), with the process terminating thereafter. With reference again to operation 1402, if the triggering event can be identified, the process proceeds to operation 1408 as described above.

Figure 15:
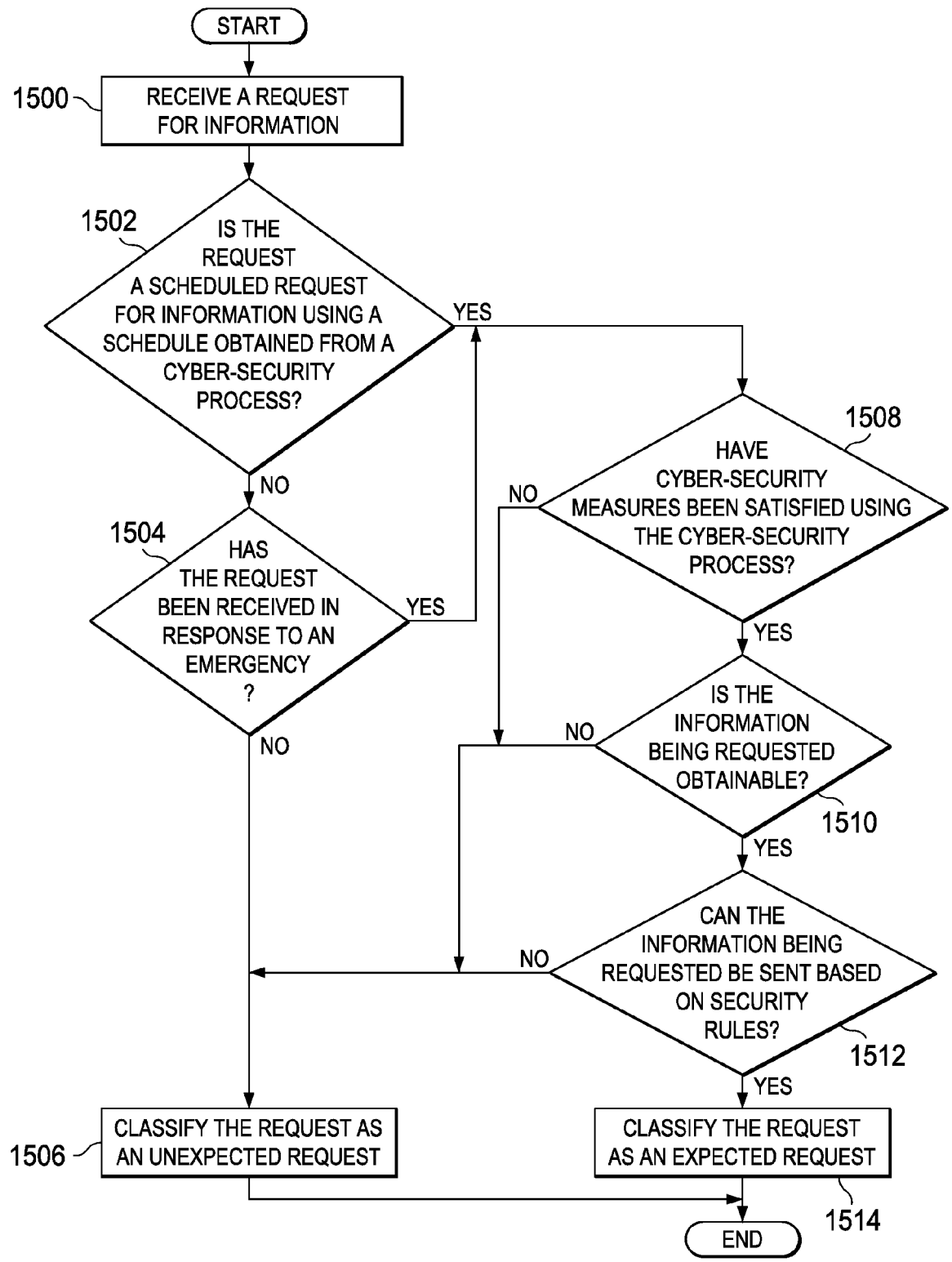
FIG. 15 is an illustration of a process for classifying a request in the form of a flowchart in accordance with an illustrative embodiment.

With reference now to FIG. 15, an illustration of a process for classifying a request in the form of a flowchart is depicted in accordance with an illustrative embodiment. The process illustrated in FIG. 15 may be implemented in electrical power environment 200 in FIG. 2. In particular, this process may be implemented in one or more agents in agents 218 in FIG. 2, agent 318 in FIG. 3, or agent 400 in FIG. 4.

The process illustrated in FIG. 15 may be one illustrative example of how a cyber-event, such as request 424 in FIG. 4, may be classified as either an expected event or an unexpected event within electrical power environment 200. The process illustrated in FIG. 15 may be used to implement operation 1104 in FIG. 11.

The process begins by the agent receiving a request for information (operation 1500). The agent determines whether the request is a scheduled request for information using a schedule obtained from a cyber-security process (operation 1502). If the request is not a scheduled event, the agent determines whether the request has been received in response to an emergency (operation 1504). If the request has not been received in response to an emergency, the agent classifies the request as an unexpected request (operation 1506), with the process terminating thereafter.

Otherwise, the agent determines whether cyber-security measures have been satisfied using the cyber-security process (operation 1508). This determination may be made by evaluating the integrity of the request using the cyber-security process.

If the cyber-security measures have not been satisfied, the process proceeds to operation 1506 as described above. Otherwise, the agent determines whether the information being requested is obtainable (operation 1510). In operation 1510, the agent makes this determination by using the cyber-security process to evaluate the content of the request. The agent determines whether the information being requested has been recorded or measured.

If the information being requested is not obtainable, the process proceeds to operation 1506 as described above. Otherwise, the agent determines whether the information being requested can be sent based on security rules (operation 1512). For example, in operation 1512, the agent determines whether sending the information per the request would violate one or more security rules or sharing rules set by the cyber-security process.

If the information being requested cannot be sent based on security rules, the process proceeds to operation 1506 as described above. Otherwise, the agent classifies the request as an expected request (operation 1514), with the process terminating thereafter. With reference again to operation 1502, if the request is a scheduled event, the process proceeds to operation 1508 as described above.

Figure 16:
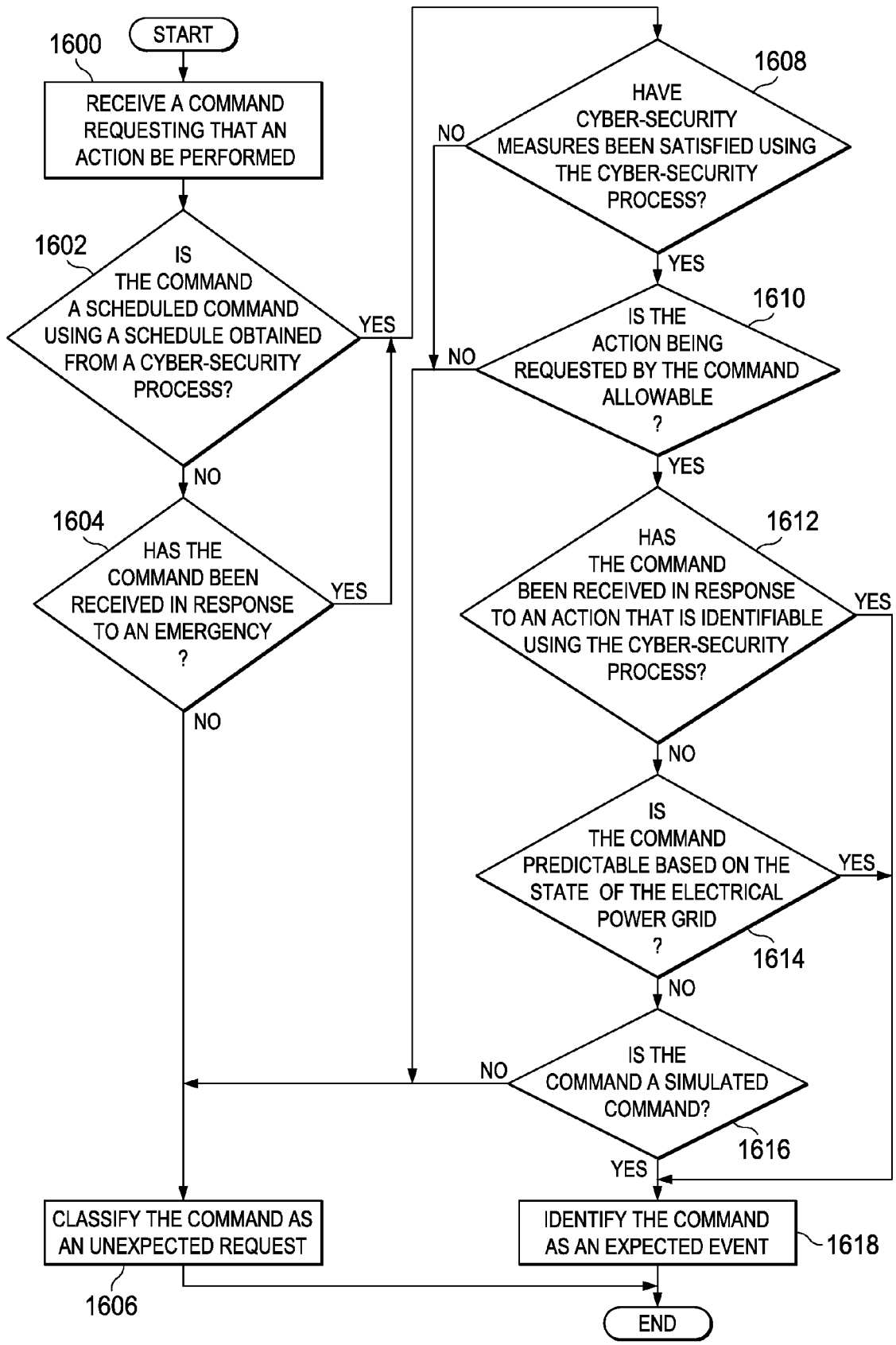
FIG. 16 is an illustration of a process for classifying a command in accordance with an illustrative embodiment.

With reference now to FIG. 16, an illustration of a process for classifying a command is depicted in accordance with an illustrative embodiment. The process illustrated in FIG. 16 may be implemented in electrical power environment 200 in FIG. 2. In particular, this process may be implemented in one or more agents in agents 218 in FIG. 2, agent 318 in FIG. 3, or agent 400 in FIG. 4.

The process illustrated in FIG. 16 may be one illustrative example of how a cyber-event, such as command 422 in FIG. 4, may be classified as either an expected event or an unexpected event within electrical power environment 200. The process illustrated in FIG. 16 may be used to implement operation 1104 in FIG. 11.

The process begins by the agent receiving a command requesting that an action be performed (operation 1600). The agent determines whether the command is a scheduled command using a schedule obtained from a cyber-security process (operation 1602). If the command is not a scheduled event, the agent determines whether the command has been received in response to an emergency (operation 1604). If the command has not been received in response to an emergency, the agent classifies the command as an unexpected request (operation 1606), with the process terminating thereafter.

Otherwise, the agent determines whether cyber-security measures have been satisfied using the cyber-security process (operation 1608). This determination may be made by evaluating the integrity of the command using the cyber-security process.

If the cyber-security measures have not been satisfied, the process proceeds to operation 1606 as described above. Otherwise, the agent determines whether the action being requested by the command is allowable (operation 1610). In operation 1610, the agent makes this determination by using the cyber-security process, for example, to evaluate security rules set by the cyber-security process.

If the action being requested is not allowable, the process proceeds to operation 1606 as described above. Otherwise, the agent determines whether the command has been received in response to an action that is identifiable using the cyber-security process (operation 1612). This determination may be made by using the cyber-security process to evaluate the content of the command. For example, the agent determines whether the command is the result of an action that can be defined or measured in some manner.

If the command has not been received in response to an action that is identifiable, the agent determines whether the command is predictable based on the state of the electrical power grid (operation 1614). If the command is not predictable, the agent determines whether the command is a simulated command (operation 1616). As used herein, a "simulated command" may be a command that was generated to simulate a real command. The simulated command may be generated for purposes of testing the electrical power grid.

If the command is a simulated command, the agent identifies the command as an expected event (operation 1618), with the process terminating thereafter. Otherwise, the process proceeds to operation 1606 as described above.

With reference again to operation 1614, if the command is predictable, the process proceeds to operation 1618. With reference again to operation 1612, if the command has been received in response to an action that is identifiable, the process proceeds to operation 1618 as described above. Further, with reference again to operation 1602, if the command is a scheduled command, the process proceeds to operation 1608 as described above.

Figure 17:
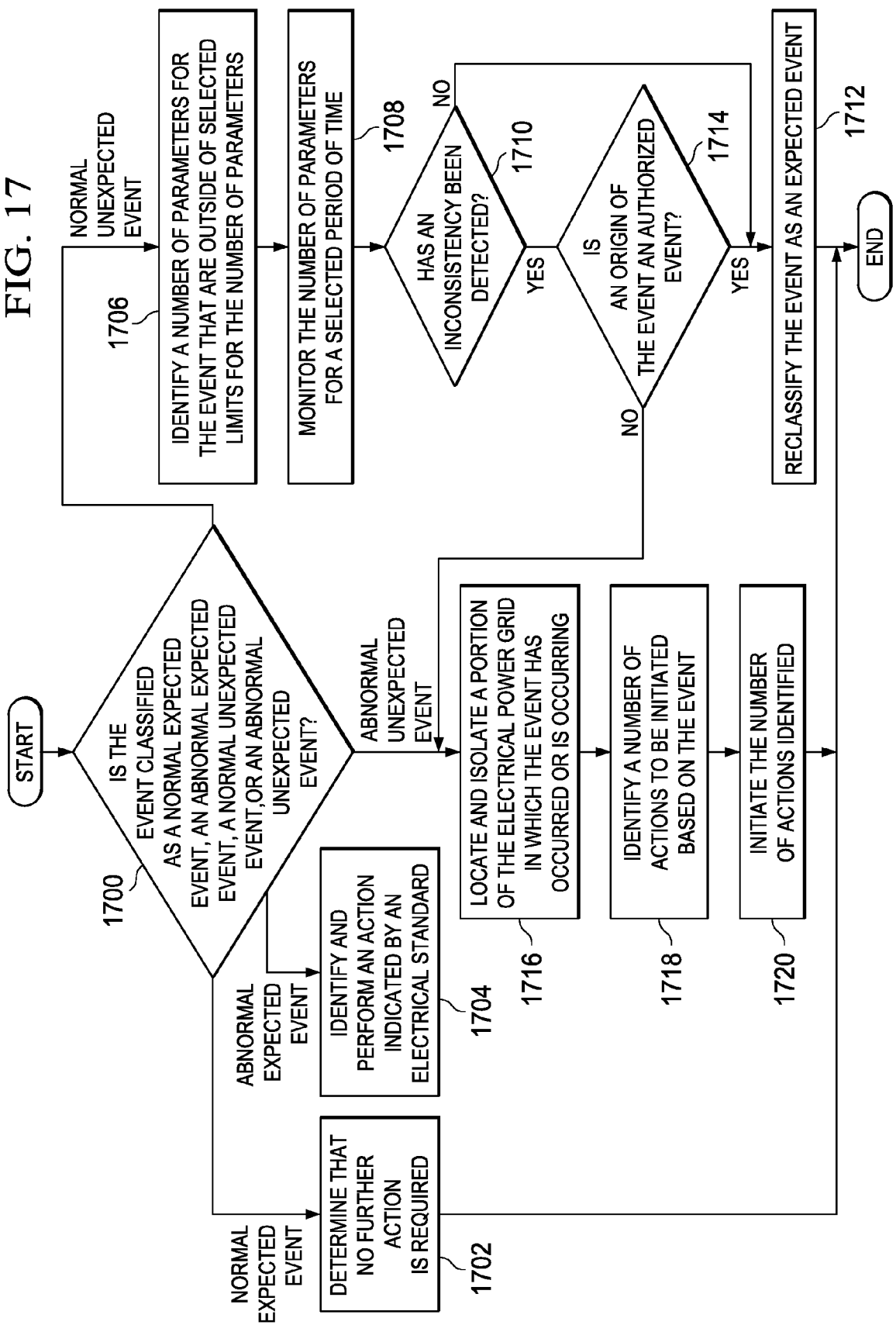
FIG. 17 is an illustration of a process for responding to a physical event based on a classification of the event in the form of a flowchart in accordance with an illustrative embodiment.

With reference now to FIG. 17, an illustration of a process for responding to a physical event based on a classification of the event in the form of a flowchart is depicted in accordance with an illustrative embodiment. The process illustrated in FIG. 17 may be used to implement operation 1004 and operation 1006 in FIG. 10.

The process illustrated in FIG. 17 may be implemented in electrical power environment 200 in FIG. 2. In particular, this process may be implemented in one or more agents in agents 218 in FIG. 2, agent 318 in FIG. 3, or agent 400 in FIG. 4. In particular, the process illustrated in FIG. 17 may be implemented using, for example, without limitation, classifier 402 and/or analyzer 404 in agent 400 in FIG. 4.

The process begins by the agent determining whether the event is classified as a normal expected event, an abnormal expected event, a normal unexpected event, or an abnormal unexpected event (operation 1700). If the event is classified as a normal expected event, the agent determines that no further action is required (operation 1702), with the process terminating thereafter.

If the event is classified as an abnormal expected event, the agent identifies and performs an action indicated by an electrical standard (operation 1704). The electrical standard used may be, for example, the National Electrical Code (NEC).

With reference again to operation 1700, if the event is classified as a normal unexpected event, the agent identifies a number of parameters for the event that are outside of selected limits for the number of parameters (operation 1706). Thereafter, the agent monitors the number of parameters for a selected period of time (operation 1708). For example, in operation 1708, the agent may monitor overall power consumption, meter readings, and/or other types of data to monitor these parameters. The agent then determines whether an inconsistency has been detected (operation 1710). The inconsistency may be some undesired occurrence within the electrical power grid.

If an inconsistency has not been detected, the agent reclassifies the event as an expected event (operation 1712), with the process terminating thereafter. In these illustrative examples, classifier 402 in agent 400 may receive this reclassification of the event and begin further reclassification of the event in operation 1106 in FIG. 11.

With reference again to operation 1710, if an inconsistency is detected, the process determines whether an origin of the event is an authorized event (operation 1714). The origin of the event may be, for example, a command that resulted in the event, a message that resulted in the event, a natural physical event, or some other suitable type of origin for the event. For example, a message may cause an action resulting in the event. In operation 1714, the agent may use control data received from a main control agent for the electrical power grid, data from an operations center, and/or other suitable data to make the determination.

If the origin of the event is authorized, the process proceeds to operation 1712 as described above. Otherwise, the process proceeds to operation 1716 described below. With reference again to operation 1700, if the event is classified as an abnormal unexpected event, the agent locates and isolates a portion of the electrical power grid in which the event has occurred or is occurring (operation 1716). This portion of the electrical power grid may be referred to as, for example, an affected segment of the electrical power grid. Isolating this portion of the electrical power grid may include stopping a flow of power into this area.

The agent then identifies a number of actions to be initiated based on the event (operation 1718). In operation 1718, the number of actions may include, for example, without limitation, contacting a number of clients, contacting a manager, generating a number of alerts, dispatching a crew, initiating a cyber-security process, redistributing power to the affected area if a bypass is allowed, and/or other suitable types of actions. The agent may then initiate the number of actions identified (operation 1720), with the process terminating thereafter.

Figure 18:
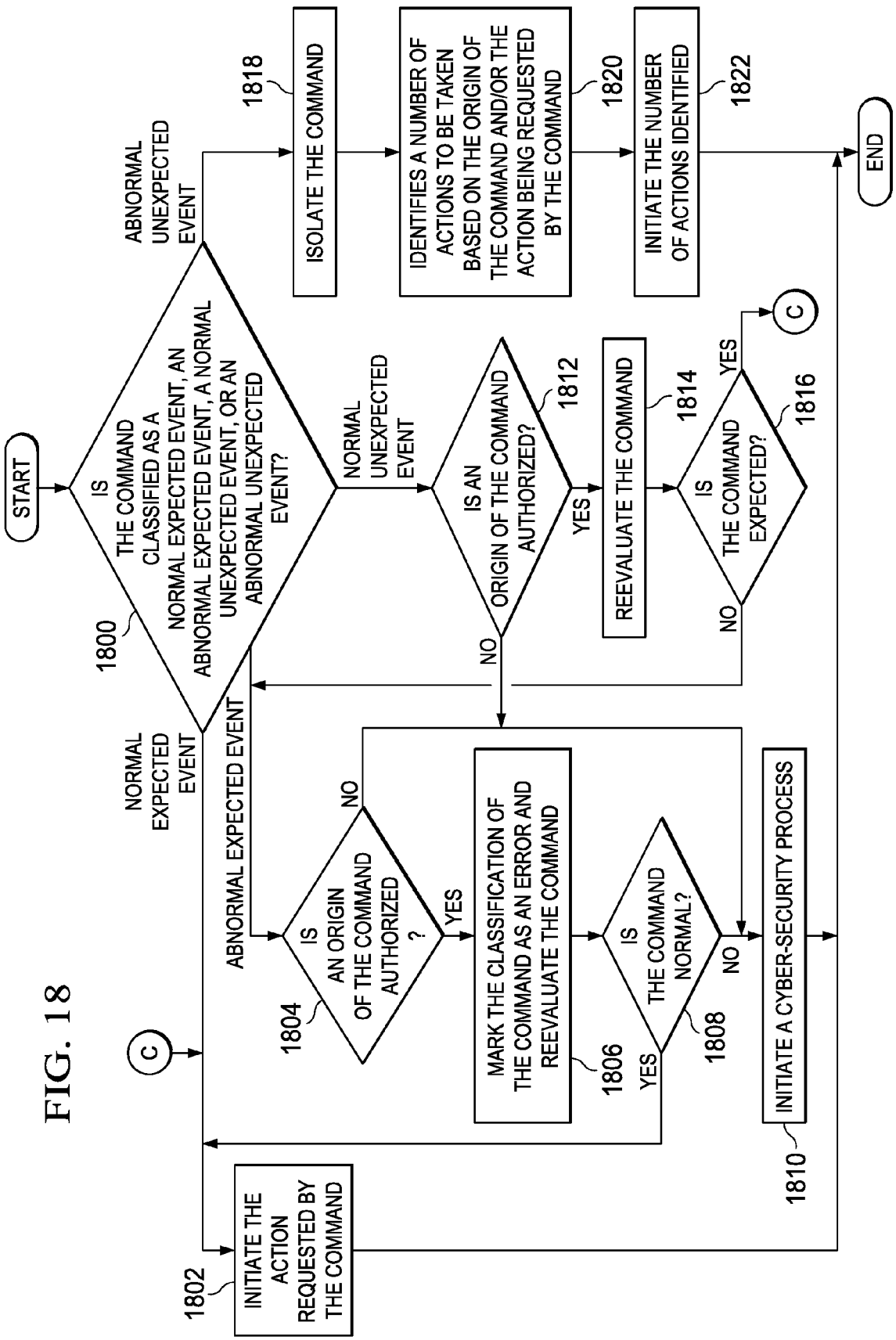
FIG. 18 is an illustration of a process for responding to a command based on a classification of the command in the form of a flowchart in accordance with an illustrative embodiment.

With reference now to FIG. 18, an illustration of a process for responding to a command based on a classification of the command in the form of a flowchart is depicted in accordance with an illustrative embodiment. The process illustrated in FIG. 18 may be used to implement operation 1004 and operation 1006 in FIG. 10.

The process illustrated in FIG. 18 may be implemented in electrical power environment 200 in FIG. 2. In particular, this process may be implemented in one or more agents in agents 218 in FIG. 2, agent 318 in FIG. 3, or agent 400 in FIG. 4. In particular, the process illustrated in FIG. 18 may be implemented using, for example, without limitation, classifier 402 and/or analyzer 404 in agent 400 in FIG. 4.

The process begins by the agent determining whether the command is classified as a normal expected event, an abnormal expected event, a normal unexpected event, or an abnormal unexpected event (operation 1800). If the command is classified as a normal expected event, the agent initiates the action requested by the command (operation 1802), with the process terminating thereafter.

If the command is classified as an abnormal expected event, the agent determines whether an origin of the command is authorized (operation 1804). If the origin of the command is authorized, the agent marks the classification of the command as an error and reevaluates the command (operation 1806). In these illustrative examples, the reevaluation of the command may be performed using classifier 402 and/or analyzer 404 in agent 400 in FIG. 4.

In particular, the command is still considered an expected command but the command is reevaluated to determine whether the command is normal or abnormal. In operation 1806, the reevaluation may be performed by analyzing the state of the electrical power grid and determining how the action requested by the command will affect the electrical power grid.

The agent then determines whether the command is normal (operation 1808). If the command is normal, the process proceeds to operation 1802 as described above. Otherwise, the agent initiates a cyber-security process (operation 1810), with the process terminating thereafter. The cyber-security process may be initiated to protect the electrical power grid.

With reference again to operation 1804, if the origin of the command is not authorized, the process proceeds to operation 1810. Further, with reference again to operation 1800, if the command is classified as a normal unexpected event, the agent determines whether an origin of the command is authorized (operation 1812).

If the origin of the command is not authorized, the process proceeds to operation 1810. Otherwise, the agent reevaluates the command (operation 1814). In particular, the command is still considered a normal command but the command is reevaluated to determine whether the command is expected or unexpected based on a state of the electrical power grid and the action being requested by the command.

The agent then determines whether the command is expected (operation 1816). If the command is expected, the process proceeds to operation 1802 as described above. Otherwise, the process proceeds to operation 1804 as described above.

With reference again to operation 1800, if the command is classified as an abnormal unexpected event, the agent isolates the command (operation 1818). The agent then identifies a number of actions to be taken based on the origin of the command and/or the action being requested by the command (operation 1820). In some illustrative example, performing operation 1810 may be considered one of the actions that may be taken. The agent then initiates the number of actions identified (operation 1822), with the process terminating thereafter.

Figure 19:
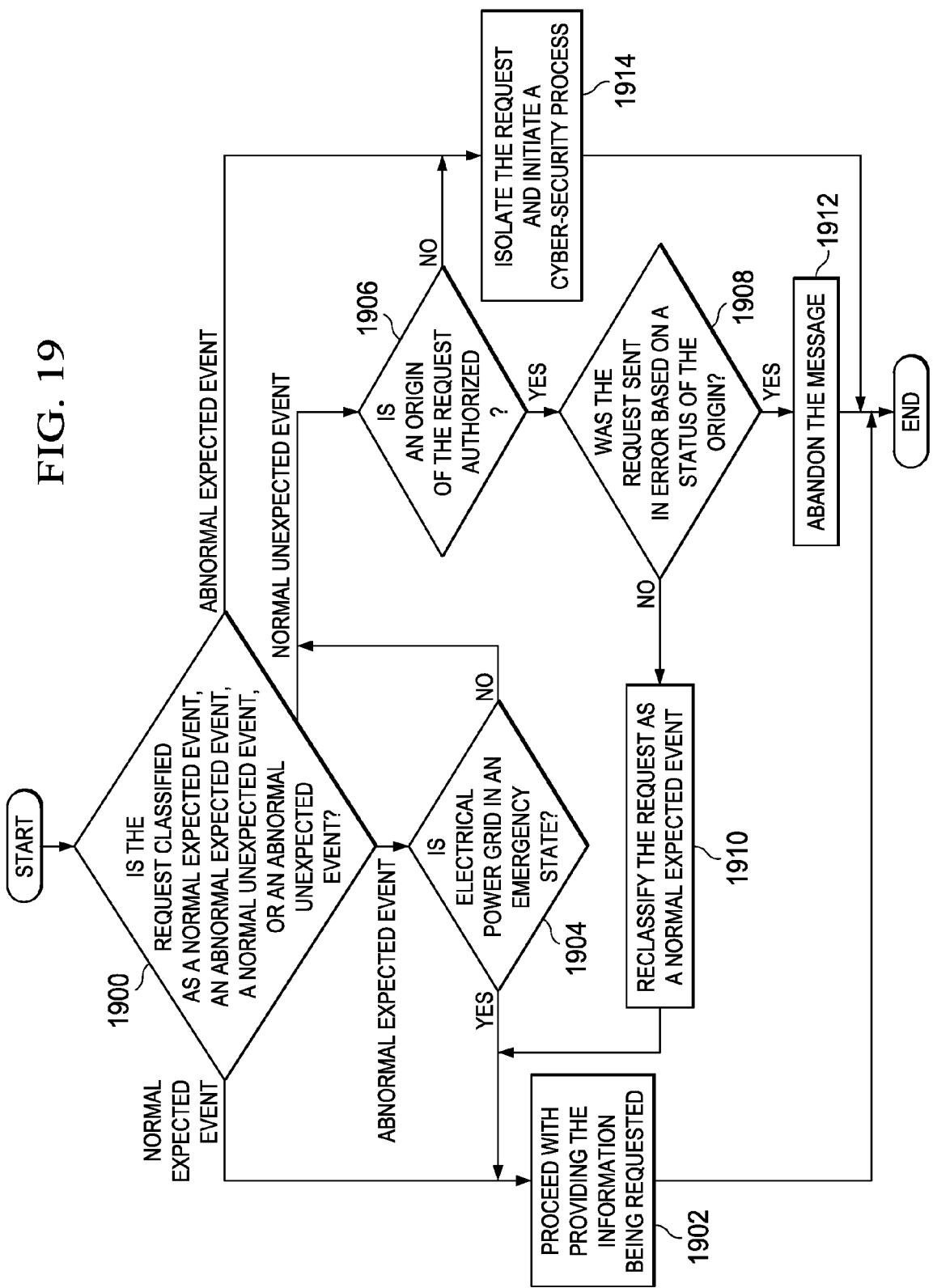
FIG. 19 is an illustration of a process for responding to a request based on a classification of the request in the form of a flowchart.

With reference now to FIG. 19, an illustration of a process for responding to a request based on a classification of the request in the form of a flowchart is depicted in accordance with an illustrative embodiment. The process illustrated in FIG. 19 may be used to implement operation 1004 and operation 1006 in FIG. 10.

The process illustrated in FIG. 19 may be implemented in electrical power environment 200 in FIG. 2. In particular, this process may be implemented in one or more agents in agents 218 in FIG. 2, agent 318 in FIG. 3, or agent 400 in FIG. 4. In particular, the process illustrated in FIG. 19 may be implemented using, for example, without limitation, classifier 402 and/or analyzer 404 in agent 400 in FIG. 4.

The process begins by the agent determining whether the request is classified as a normal expected event, an abnormal expected event, a normal unexpected event, or an abnormal unexpected event (operation 1900). The request may be a request for information.

Further, the request may be classified as a normal expected event when the request is a scheduled and/or approved request. The request may be classified as an abnormal expected event when the request is not a scheduled request but is a type of request that may be received in an emergency situation. Further, the request may be classified as a normal unexpected event when the request is not a request during an emergency. The request may be classified as an abnormal unexpected event when the request is neither scheduled nor received during an emergency.

If the request is classified as a normal expected event, the agent proceeds with providing the information being requested (operation 1902), with the process terminating thereafter. If the request is classified as an abnormal expected event, the process determines whether any portion of the electrical power grid is in an emergency state (operation 1904). This portion may be, for example, one or more segments of the electrical power grid. The agent may use, for example, sensor data and/or other types of data from the electrical power grid to make this determination.

If any portion of the electrical power grid is in an emergency state, the process proceeds to operation 1902 as described above. Otherwise, the agent proceeds to operation 1906 as described below. With reference again to operation 1900, if the request is classified as a normal unexpected event, the agent determines whether an origin of the request is authorized (operation 1906).

If the agent determines that the origin of the request is authorized, the agent determines whether the request was sent in error based on a status of the origin (operation 1908). In operation 1908, the agent checks the status of the origin. For example, the process may use sensor data from a device in the electrical power grid that sent the request to determine whether the device has been compromised, is functioning within selected limits, or operating in some other manner.

If the request was not sent in error, the agent reclassifies the request as a normal expected event (operation 1910) and then proceeds to operation 1902 as described above. With reference again to operation 1908, if the request was sent in error, the agent abandons the message (operation 1912), with the process terminating thereafter. In operation 1912 the agent does not provide the information being requested. In some cases, in operation 1912, the agent sends the request to classifier 402 in agent 400 for reevaluation.

With reference again to operation 1900, if the request is classified as an abnormal unexpected event, the agent isolates the request and initiates a cyber-security process (operation 1914), with the process terminating thereafter. With reference again to operation 1906, if the agent determines that the origin of the request is not authorized, the process proceeds to operation 1914 as described above.

The flowcharts, process flows, and block diagrams in the different depicted embodiments illustrate the architecture, functionality, and operation of some possible implementations of apparatus and methods in an illustrative embodiment. In this regard, each block in the flowcharts, process flows, or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Figure 20:
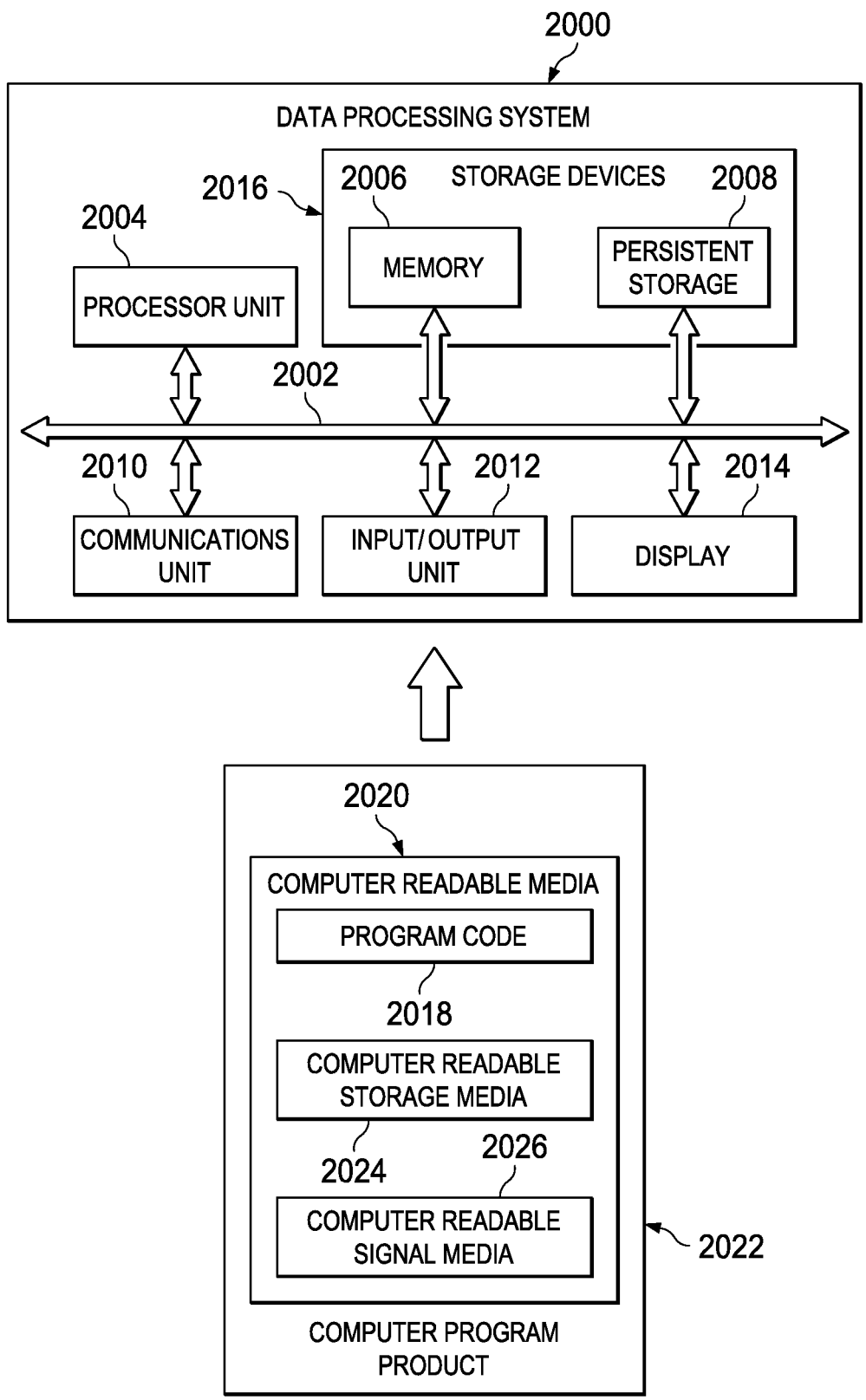
FIG. 20 is an illustration of a data processing system in the form of a block diagram in accordance with an illustrative embodiment.

Turning now to FIG. 20, an illustration of a data processing system in the form of a block diagram is depicted in accordance with an illustrative embodiment. In this illustrative example, data processing system 2000 may be used to implement a data processing system in data processing systems 216 in FIG. 2 and/or processor unit 310 in FIG. 3.

Further, data processing system 2000 may be used to implement an agent in accordance with an illustrative embodiment. For example, data processing system 2000 may be used to implement an agent in agents 218 in FIG. 2, agent 318 in FIG. 3, and/or agent 400 in FIG. 4. In this illustrative example, data processing system 2000 includes communications framework 2002, which provides communications between processor unit 2004, memory 2006, persistent storage 2008, communications unit 2010, input/output (I/O) unit 2012, and display 2014.

Processor unit 2004 serves to execute instructions for software that may be loaded into memory 2006. Processor unit 2004 may be a number of processors, a multi-processor core, or some other type of processor, depending on the particular implementation. A number, as used herein with reference to an item, means one or more items. Further, processor unit 2004 may be implemented using a number of heterogeneous processor systems in which a main processor is present with secondary processors on a single chip. As another illustrative example, processor unit 2004 may be a symmetric multi-processor system containing multiple processors of the same type.

Memory 2006 and persistent storage 2008 are examples of storage devices 2016. A storage device is any piece of hardware that is capable of storing information, such as, for example, without limitation, data, program code in functional form, and/or other suitable information either on a temporary basis and/or a permanent basis. Storage devices 2016 also may be referred to as computer readable storage devices in these examples. Memory 2006, in these examples, may be, for example, a random access memory or any other suitable volatile or non-volatile storage device. Persistent storage 2008 may take various forms, depending on the particular implementation.

For example, persistent storage 2008 may contain one or more components or devices. For example, persistent storage 2008 may be a hard drive, a flash memory, a rewritable optical disk, a rewritable magnetic tape, or some combination of the above. The media used by persistent storage 2008 also may be removable. For example, a removable hard drive may be used for persistent storage 2008.

Communications unit 2010, in these examples, provides for communications with other data processing systems or devices. In these examples, communications unit 2010 is a network interface card. Communications unit 2010 may provide communications through the use of either or both physical and wireless communications links.

Input/output unit 2012 allows for input and output of data with other devices that may be connected to data processing system 2000. For example, input/output unit 2012 may provide a connection for user input through a keyboard, a mouse, and/or some other suitable input device. Further, input/output unit 2012 may send output to a printer. Display 2014 provides a mechanism to display information to a user.

Instructions for the operating system, applications, and/or programs may be located in storage devices 2016, which are in communication with processor unit 2004 through communications framework 2002. In these illustrative examples, the instructions are in a functional form on persistent storage 2008. These instructions may be loaded into memory 2006 for execution by processor unit 2004. The processes of the different embodiments may be performed by processor unit 2004 using computer-implemented instructions, which may be located in a memory, such as memory 2006.

These instructions are referred to as program code, computer usable program code, or computer readable program code that may be read and executed by a processor in processor unit 2004. The program code in the different embodiments may be embodied on different physical or computer readable storage media, such as memory 2006 or persistent storage 2008.

Program code 2018 is located in a functional form on computer readable media 2020 that is selectively removable and may be loaded onto or transferred to data processing system 2000 for execution by processor unit 2004. Program code 2018 and computer readable media 2020 form computer program product 2022 in these examples. In one example, computer readable media 2020 may be computer readable storage media 2024 or computer readable signal media 2026.

Computer readable storage media 2024 may include, for example, an optical or magnetic disk that is inserted or placed into a drive or other device that is part of persistent storage 2008 for transfer onto a storage device, such as a hard drive, that is part of persistent storage 2008. Computer readable storage media 2024 also may take the form of a persistent storage, such as a hard drive, a thumb drive, or a flash memory, that is connected to data processing system 2000. In some instances, computer readable storage media 2024 may not be removable from data processing system 2000.

In these examples, computer readable storage media 2024 is a physical or tangible storage device used to store program code 2018 rather than a medium that propagates or transmits program code 2018. Computer readable storage media 2024 is also referred to as a computer readable tangible storage device or a computer readable physical storage device. In other words, computer readable storage media 2024 is a media that can be touched by a person.

Alternatively, program code 2018 may be transferred to data processing system 2000 using computer readable signal media 2026. Computer readable signal media 2026 may be, for example, a propagated data signal containing program code 2018. For example, computer readable signal media 2026 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 2018 may be downloaded over a network to persistent storage 2008 from another device or data processing system through computer readable signal media 2026 for use within data processing system 2000. For instance, program code stored in a computer readable storage medium in a server data processing system may be downloaded over a network from the server to data processing system 2000. The data processing system providing program code 2018 may be a server computer, a client computer, or some other device capable of storing and transmitting program code 2018.

The different components illustrated for the data processing system 2000 are not meant to provide architectural limitations to the manner in which different embodiments may be implemented. The different illustrative embodiments may be implemented in a data processing system including components in addition to or in place of those illustrated for data processing system 2000. Other components shown in FIG. 20 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 2004 may take the form of a hardware unit that has circuits that are manufactured or configured for a particular use. This type of hardware may perform operations without needing program code to be loaded into a memory from a storage device to be configured to perform the operations.

For example, when processor unit 2004 takes the form of a hardware unit, processor unit 2004 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a field programmable logic array, a field programmable gate array, and other suitable hardware devices. With this type of implementation, program code 2018 may be omitted, because the processes for the different embodiments are implemented in a hardware unit.

In still another illustrative example, processor unit 2004 may be implemented using a combination of processors found in computers and hardware units. Processor unit 2004 may have a number of hardware units and a number of processors that are configured to run program code 2018. With this depicted example, some of the processes may be implemented in the number of hardware units, while other processes may be implemented in the number of processors.

In another example, a bus system may be used to implement communications framework 2002 and may be comprised of one or more buses, such as a system bus or an input/output bus. Of course, the bus system may be implemented using any suitable type of architecture that provides for a transfer of data between different components or devices attached to the bus system.

Additionally, a communications unit may include a number of devices that transmit data, receive data, or transmit and receive data. A communications unit may be, for example, a modem or a network adapter, two network adapters, or some combination thereof. Further, a memory may be, for example, memory 2006 or a cache, such as found in an interface and memory controller hub that may be present in communications framework 2002.

The description of the different illustrative embodiments has been presented for purposes of illustration and description, and is not intended to be exhaustive or limited to the embodiments in the form disclosed. Many modifications and variations will be apparent to those of ordinary skill in the art.

Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
a non-transitory computer readable medium;
a processor; and
an agent configured to:
 receive information from an electrical power grid,
 identify an event from the information, classify the event,
 determine whether to initiate an action based on a classification of the event,
 initiate the action in response to a determination to initiate the action,
 determine if a message that causes another action that results in the event is an expected message,
 determine if the event is a normal event, and
 classify the event based on whether the message is the expected message and whether the event is the normal event.

2. The apparatus of claim 1, wherein to initiate the action in response to the determination to initiate the action, the agent is configured to identify the action and initiate the action identified in response to the determination to initiate the action.

3. The apparatus of claim 1, wherein the event is classified as one of a normal expected event, an abnormal expected event, a normal unexpected event, and an abnormal unexpected event.

4. The apparatus of claim 3, wherein the agent is configured to determine whether to initiate the action in response to the event being classified as the abnormal unexpected event.

5. The apparatus of claim 1, wherein the agent is configured to identify a message in the information in which the message is a cause of the event and wherein in being configured to determine whether to initiate the action based on the classification of the event, the agent is configured to determine whether to initiate the action based on the classification of the event and based on an origin of the message, wherein the message is selected from one of a command and a request.

6. The apparatus of claim 5, wherein the agent is configured to determine that the action is needed when the event is classified as an abnormal unexpected event and the message originates from outside of the electrical power grid.

7. The apparatus of claim 1, wherein the agent includes a classifier configured to receive the information from the electrical power grid, identify the event from the information, and classify the event, and an analyzer configured to determine whether to initiate the action based on the classification of the event and initiate the action in response to the determination to initiate the action.

8. The apparatus of claim 1 further comprising: a node in the electrical power grid, wherein the agent is associated with the node.

9. The apparatus of claim 1 further comprising:
a number of lines in the electrical power grid, wherein the number of lines is configured to carry electrical power;
a plurality of nodes in the electrical power grid, wherein the plurality of nodes is configured to control the electrical power carried on the number of lines;

a communications network configured to carry the information; and a number of agents associated with the plurality of nodes, wherein the number of agents is configured to communicate with each other using the communications network, configure the plurality of nodes in the electrical power grid into a circuit, control a delivery of the electrical power through the circuit to a number of loads associated with the circuit, and generate messages.

10. An apparatus comprising:

a plurality of nodes in an electrical power grid, wherein the plurality of nodes is configured to control electrical power carried on a number of lines in the electrical power grid;

a communications network configured to carry information; and a number of agents associated with the plurality of nodes, wherein the number of agents is configured to send the information to each other using the communications network and wherein an agent in the number of agents is configured to receive the information from the electrical power grid, identify an event from the information, classify the event, determine whether to initiate an action based on a classification of the event, and initiate the action in response to a determination to initiate the action;

wherein the agent is further configured to identify a message in the information in which the message is a cause of the event and wherein in being configured to determine whether to initiate the action based on the classification of the event, the agent is configured to determine whether to initiate the action based on the classification of the event and based on an origin of the message.

11. The apparatus of claim 10, wherein in being configured to initiate the action in response to the determination to initiate the action, the agent is configured to identify the action and initiate the action identified in response to the determination to initiate the action.

12. The apparatus of claim 10, wherein the event is classified as one of a normal expected event, an abnormal expected event, a normal unexpected event, and an abnormal unexpected event, and wherein the agent is configured to initiate the action in response to the event being classified as the abnormal unexpected event.

13. The apparatus of claim 10, wherein the agent is configured to determine that the action is needed when the event is classified as an abnormal unexpected event and the message originates from outside of the electrical power grid.

14. The apparatus of claim 10, wherein the agent includes a classifier configured to receive the information from the electrical power grid, identify the event from the information, and classify the event, and an analyzer configured to determine whether to initiate the action based on the classification of the event and initiate the action in response to the determination to initiate the action.

15. A method for processing information in an electrical power grid, the method comprising:

receiving the information from a number of agents in the electrical power grid;

identifying an event from the information; classifying the event; determining whether to initiate an action based on a classification of the event;

initiating the action in response to a determination to initiate the action; and identifying a message in the information in which the message is a cause of the event and wherein determining whether to initiate the action based on the classification of the event comprises:

determining whether to initiate the action based on the classification of the event and based on an origin of the message, wherein the message is selected from one of a command and a request.

16. The method of claim 15, initiating the action in response to the determination to initiate the action comprises:

identifying the action; and initiating the action identified in response to the determination to initiate the action.

17. The method of claim 15, wherein the event is classified as one of a normal expected event, an abnormal expected event, a normal unexpected event, and an abnormal unexpected event.

* * * * *